United States Patent [19]
Acosta et al.

[11] Patent Number: 6,166,729
[45] Date of Patent: *Dec. 26, 2000

[54] REMOTE DIGITAL IMAGE VIEWING SYSTEM AND METHOD

[75] Inventors: Edward Acosta, Austin, Tex.; Frank Kao, Freemont, Calif.

[73] Assignee: BroadCloud Communications, Inc., Austin, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,557

[22] Filed: May 7, 1997

[51] Int. Cl.$^7$ ....................................................... H04N 7/10
[52] U.S. Cl. ............................... 345/327; 709/219; 348/7
[58] Field of Search ............................. 348/6, 7, 12, 13, 348/723; 345/327; 709/217, 219; 455/3.1, 3.2, 4.2; 370/310, 338, 466, 467, 469

[56] References Cited

U.S. PATENT DOCUMENTS

| | | | |
|---|---|---|---|
| 4,356,387 | 10/1982 | Tsubota et al. | 377/6 |
| 4,528,679 | 7/1985 | Shahbaz et al. | 377/6 |
| 4,825,457 | 4/1989 | Lebowitz | 348/143 |
| 4,839,631 | 6/1989 | Tsuji | 340/541 |
| 4,845,682 | 7/1989 | Boozer et al. | 367/93 |
| 4,942,464 | 7/1990 | Milatz | 358/108 |
| 4,975,771 | 12/1990 | Kassathy | 348/6 |
| 5,131,508 | 7/1992 | Suzuki | 187/132 |
| 5,138,638 | 8/1992 | Frey | 377/6 |
| 5,255,301 | 10/1993 | Nakamura et al. | 377/6 |
| 5,305,390 | 4/1994 | Frey et al. | 382/2 |
| 5,321,514 | 6/1994 | Martinez | 348/723 |
| 5,331,312 | 7/1994 | Kudoh | 340/541 |
| 5,412,426 | 5/1995 | Jotty | 348/723 |
| 5,519,669 | 5/1996 | Ross et al. | 367/93 |
| 5,568,205 | 10/1996 | Hurwitz | 348/723 |
| 5,659,350 | 8/1997 | Hendricks et al. | 348/6 |
| 5,666,159 | 9/1997 | Parulski et al. | 348/723 |
| 5,668,610 | 9/1997 | Bossard | 348/723 |
| 5,706,290 | 1/1998 | Shaw et al. | 345/328 |
| 5,712,679 | 1/1998 | Coles | 348/158 |
| 5,729,825 | 3/1998 | Kostreski et al. | 348/21 |
| 5,751,338 | 5/1998 | Ludwig, Jr. | 348/17 |
| 5,762,552 | 6/1998 | Vuong et al. | 463/25 |

*Primary Examiner*—Victor R. Kostak
*Attorney, Agent, or Firm*—The Law Firm of H. Dale Langley, Jr., P.C.

[57] ABSTRACT

A remote viewing system is for viewing digital images of remote locations. The viewing system includes a plurality of digital image acquisition devices. The devices are located at remote locations. The system also includes a plurality of digital image transmission devices connected to respective ones of the digital image acquisition devices. A digital image receiving device is communicatively connected to each of the digital image transmission devices. A digital image server device is connected to the digital image receiving device. The digital image server device is connected to a network, such as the Internet. A network-enabled computer can access select ones of the digital images over the network. The digital image receiving device and the digital image server device cooperate to make available to the network-enabled computer the select ones of the digital images for download from the network.

8 Claims, 27 Drawing Sheets

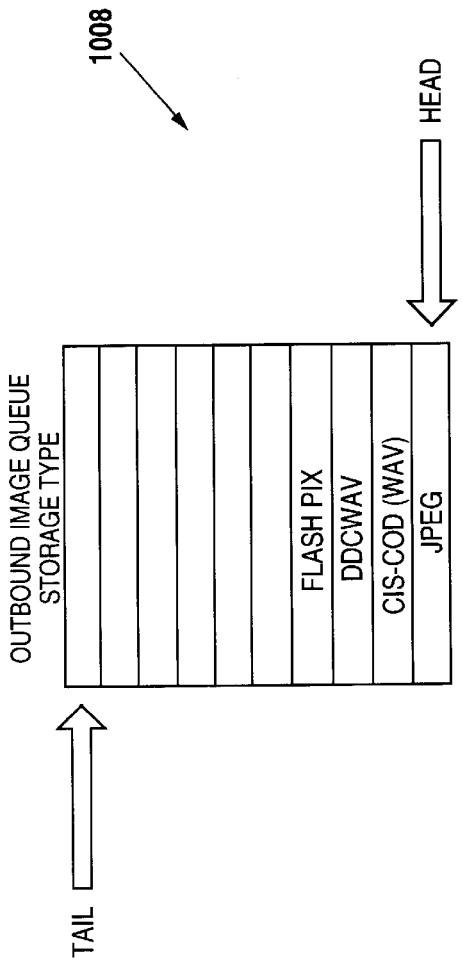

Fig. 26

```
TYPEDEF STRUCT OUTBOUND_ELEMENT {
    OUTBND_IMG_REC    *P_NEXT;                         /* POINTER TO NEXT ELEMENT IN THE QUEUE */
    UNSIGNED LONG     TIME_TO_LIVE;                    /* TIME LEFT BEFORE END OF THIS IMAGES UPDATE CYCLE */
    CHAR              CAMCODE_NAMESIZE];               /* NETCAM/IMAGE ID*/
    UNSIGNED LONG     QUEUETIME;                       /* TIME IN TICKS THAT IMAGE WAS PUT IN QUE */
    INT               MAX_REFRESH;                     /* SHORTEST UPDATE INTERVAL THIS IMAGE SERVICES */
    UNSIGNED CHAR     *P_IDATA;                        /* POINTER TO THE ACTUAL COMPRESSED IMAGE DATA */
    INT               FILETYPE;                        /* GIVES FILE TYPE, COMP. TYPE OF IMAGE DATA */
    LONG              ISIZE;                           /* GIVES SIZE OF COMPRESSED IMAGE DATA */
    LONG              FSIZE;                           /* GIVES SIZE OF ENTIRE IMAGE FILE */
    BOOLEAN           ARCHIVE;                         /* FLAG TELLS WEATHER OR NOT TO ALSO ARCHIVE IMAGE */
} OUTBND_IMG_REC;

TYPEDEF STRUCT OUTBOUND_QUEUE {
    OUTBND_IMG_REC    *P_HEAD;                         /* START OF THE OUTPUT FIFO QUEUE */
    OUTBND_IMG_REC    *P_TAIL;                         /* LAST ELEMENT IN THE FIFO QUEUE */
    INT               SIZE;                            /* MAX. CAPACITY OF THE QUEUE */
    INT               IUD_RATE;                        /* IMAGE UPDATE RATE OF THE QUEUE */
    INT               DWELL_RATE;                      /* # OF IMAGES TO PULL IN SINGLE CYCLE */
} OUTQUEUE;
```

REMOTE DIGITAL IMAGE VIEWING SYSTEM AND METHOD

BACKGROUND OF THE INVENTION

The invention generally relates to remote visual monitoring systems and methods and, more particularly, relates to cameras and communications network systems and methods providing for remote viewing of live visual information over the network.

Visual monitoring for security and other reasons is presently employed and generally known. In conventional visual monitoring systems, a camera is directed at an area to be viewed. The camera is wired to a monitor. The monitor is located at a remote geographic location to the camera.

Wireless digital communications are common. Present wireless digital cellular networks, for example, provide for such communications. Typical cellular systems support voice calls and data communications. Various protocols and packeted information formats are employed in cellular communications to achieve various results. Data transmission and reception rates in cellular networks have typically been limited. The limitation has not been particularly suitable for communication of visual information data, particularly live visual images. New protocols, compression techniques, and communications equipment are continually being developed.

Wide area networks, including, for example, the Internet, are widely known and accessible. Communications over such networks take a variety of forms. In the case of the Internet, individual consumers, as well as large business, employ the giant network for communications. Those communications include everything from information, to voice, to images, to live video, all communicated in the form of digital data. Wireless communications with the Internet and other networks is possible with the advent of digital modems, and these and other communication devices and methods continue to be evolving.

Although many aspects of networks, digital cellular communications, and remote visual monitoring systems are conventional, those aspects have not provided satisfactory remote acquisition of a variety of live visual information and transmission of that information via wireless and network access, with switching to make the information available to select viewers. Such systems and methods for remotely viewing live visual information, however, would be desirable. Limitations on the prior art that have prevented network access viewing of remotely monitored visual occurrences have included rates of wireless communications of visual information, accessibility to networks capable of providing such information, specialized equipment and software required for communicating such information, and complexity, expense, and capabilities of available cameras, networks, and related systems and operations.

Therefore what is needed is systems and methods for providing remote viewing over a network, such as the Internet, of select live visual images.

SUMMARY OF THE INVENTION

The embodiments of the present invention, accordingly, provide systems and methods for acquisition and transmission of live images over the Internet or dedicated networks with switching to make the information available to select viewers at locations remote from the images. These systems and methods provide wide area visual monitoring by use of cameras, wireless communications, back-end image processing software, and wide area wired networks systems, together with speedy and efficient protocols and operations.

To this end, an embodiment of the invention is a remote viewing system for viewing a digital image of a remote location. The system includes a digital image acquisition device located at the remote location, a digital image transmission device, connected to the digital image acquisition device, a digital image receiving device, communicatively connected to the digital transmission device, and a digital image server device, connected to the digital image receiving device.

Another embodiment of the invention is a camera. The camera includes an image acquisition device for acquiring an image in real-time, a video digitizer for digitizing the image, and a processor for compressing the image.

Yet another embodiment of the invention is a system for viewing an image of a remote location. The system includes a digital camera for acquiring the image as a real-time, live image, a switch, means for communicating the image to the switch, so that the digital camera and the switch are communicatively interconnected, and a network including at least one customer computer, the network being communicatingly connected to the switch. The switch processes the image and transmits the image to selective ones of the at least one customer computer.

Another embodiment of the invention is a method for remotely viewing a digital image of a location. The method includes steps of acquiring a digital image of the location, transmitting the digital image, receiving the digital image, and serving the digital image to a select computer connected to a network served.

Yet another embodiment of the invention is a method of photography. The method includes steps of acquiring an image in real-time, digitizing the image, and compressing the image.

Another embodiment of the invention is a method of viewing an image of a remote location. The method includes steps of acquiring the image as a real-time, live image, communicating the image to the remote location, and switching to selectively deliver the image to at least one select network-enabled computer.

BRIEF DESCRIPTION OF THE DRAWINGS

FIG. 26 is an illustration of an outbound image queue of the Web Server Communications Manager of the system of FIG. 1, according to embodiments of the invention.

DETAILED DESCRIPTION OF THE PREFERRED EMBODIMENT

The Remote Viewing System

Figure 1:
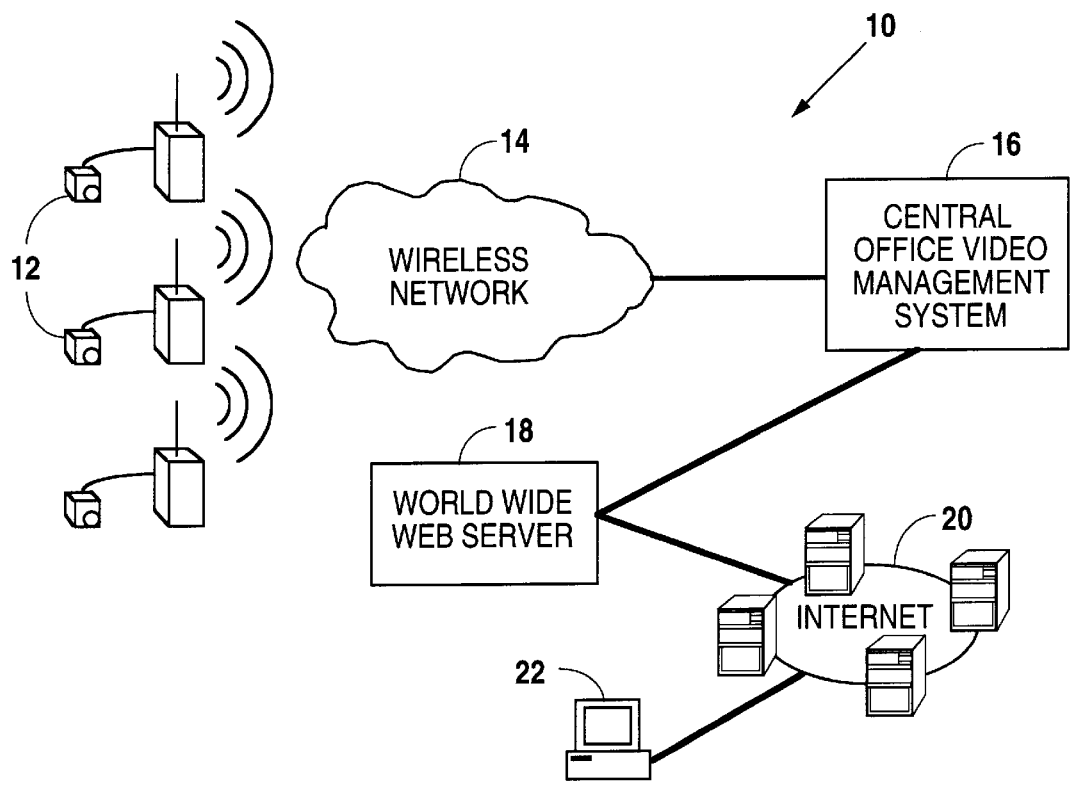
FIG. 1 is a system for viewing live images, in real-time, from multiple remote locations by communicating the images over wireless and wired networks and by accessing the images from multiple user computers connected to the networks, according to embodiments of the invention.

Referring to FIG. 1, a remote viewing system 10 includes camera devices 12, a wireless network 14, a central office video management system (COVMS) 16, a World Wide Web server 18, a network 20, and a computer 22. The camera devices 12 are operatively connected via radio frequency with the wireless network 14 for communications therebetween. The wireless network 14 is connected by communications wire with the COVMS 16. The COVMS 16 is connected by communications wire with the World Wide Web server 18. The World Wide Web server 18 is connected by communications wire with the network 20, such as the Internet. The computer 22 is operatively connected with the network 20 for communications between the computer 22 and the network 20. The computer 22 is equipped with appropriate software, for example, a web browser, for accessing information available on the network 20.

Figure 2:
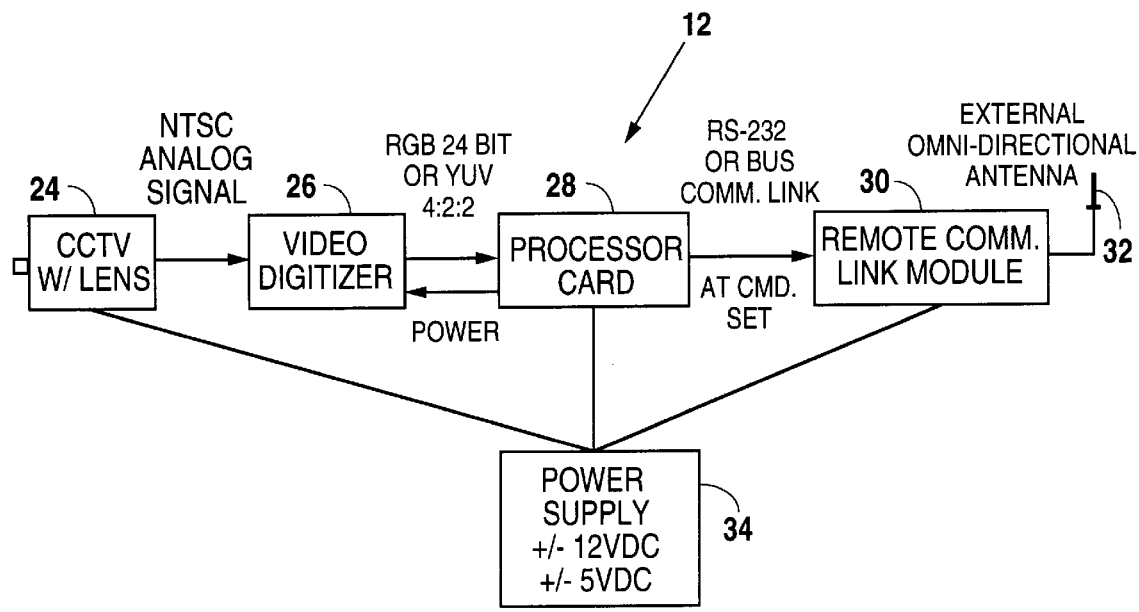
FIG. 2 is a camera element for acquiring the images for the system of FIG. 1 and for communicating the images over wireless networks, according to embodiments of the invention.

Referring to FIG. 2, the camera device 12 includes a camera 24, a video digitizer 26, a processor card 28, a remote communications link module 30, an antenna 32, and a power supply 34. The camera 24 is connected to the power supply 34 and the video digitizer 26. The video digitizer 26 is connected to the processor card 28. The processor card 28 is also connected to the power supply 34. The remote communications link module 30 is connected to the processor card 28 and the power supply 34. The remote communications link module 30 is also connected to an antenna 32.

The camera 24 is a CCD CCTV camera element, for example, a one-half inch camera element, and a camera lens. A camera enclosure holds the camera element, the camera lens, and the power supply 34. The camera element and the camera lens are conventional components known to those skilled in the art. The camera enclosure also contains the video digitizer 26, the processor card 28, and the remote communications link module 30. A power cord may also connect the power supply of the camera enclosure to the components. The camera enclosure may also be equipped with a separate power cord suitable for standard 120V, 60 HZ, AC electric outlets. The antenna 32 is connected to the camera enclosure.

As previously mentioned, the camera 24 is connected to the video digitizer 26. The video digitizer 26 is a digital video frame grabber element. A standard coaxial cable with BNC connectors connects the camera 24 to the video digitizer 26. The video digitizer 26 is a conventional element known to those skilled in the art.

The processor card 28 connects to the video digitizer 26 by a PC-104 standard bus header connector. Power is supplied to the video digitizer 26 by the processor card 28 from the power supply 34.

The remote communications link module 30 is connected to the processor card 28 by an RS-232 link to a standard UART chip of the processor card 28 (as hereinafter more particularly described). The remote communications link module 30 is a radio frequency (RF) radio capable of communicating with the wireless network 14 (shown in FIG. 1). For example, the remote communications link module 30 is a CDPD modem.

The antenna 32 connects with the remote communications link module 30. The antenna 32 is an external omni-directional antenna. The antenna 32 provides RF communications with the wireless network 14 (shown in FIG. 1).

The power supply 34 is a standard source of power, such as a conventional 120V supply or a battery that, in any event, generates about ±5 volts and also generates about ±12 volts. The power supply 34 is connected with the camera 24, the processor card 28, and the remote communications link 30 and provides power thereto. As previously mentioned, power is supplied to the video digitizer 26 from the power supply 34 via connection through the processor card 28.

Figure 3:
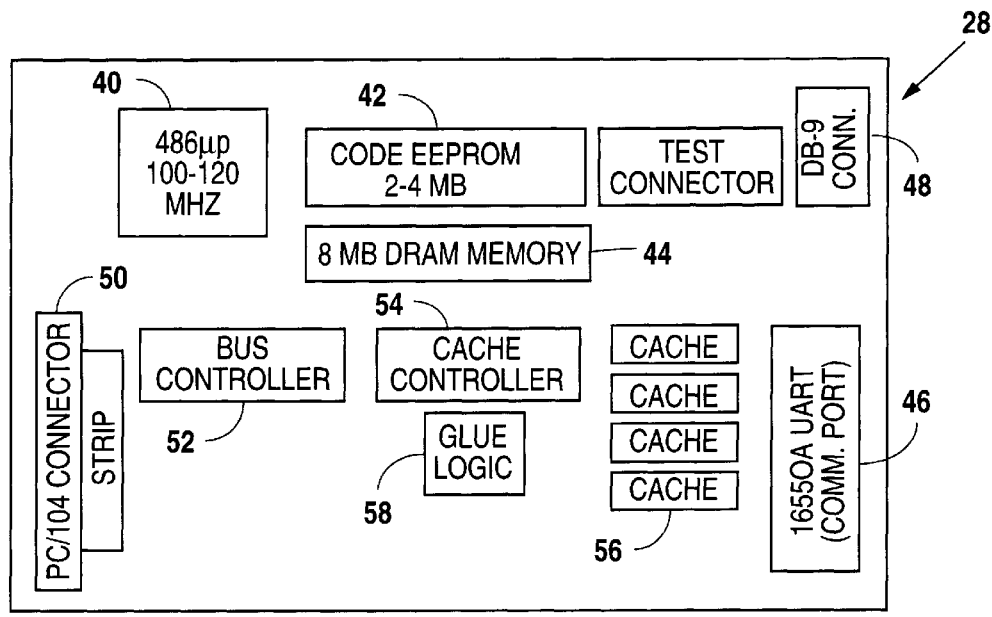
FIG. 3 is a processor card of the camera element of FIG. 2, according to embodiments of the invention.

Referring to FIG. 3, the processor card 28 includes a 486-class microprocessor 40 operating at 100–120 MHZ. The microprocessor 40 is connected to an EEPROM 42, for example, 2–4 MB of memory, for code storage. The microprocessor 40 is also connected to DRAM memory, for example, 8 MB of memory, for program execution. A UART chip 46, for example, a model 16550A UART, together with dual row header strips 48, are provided to implement a serial port for connection to the remote communications link module 30 (shown in FIG. 2). The processor card 28 also includes a PC-104 bus connector 50 for connecting the processor card 28 with the video digitizer 26 via a PC-104 bus. In addition to those elements, the processor card 28 includes conventional elements of a bus controller 54, cache memory 56, and glue logic 58. The processor card 28 is conventional and known to those skilled in the art.

Figure 4:
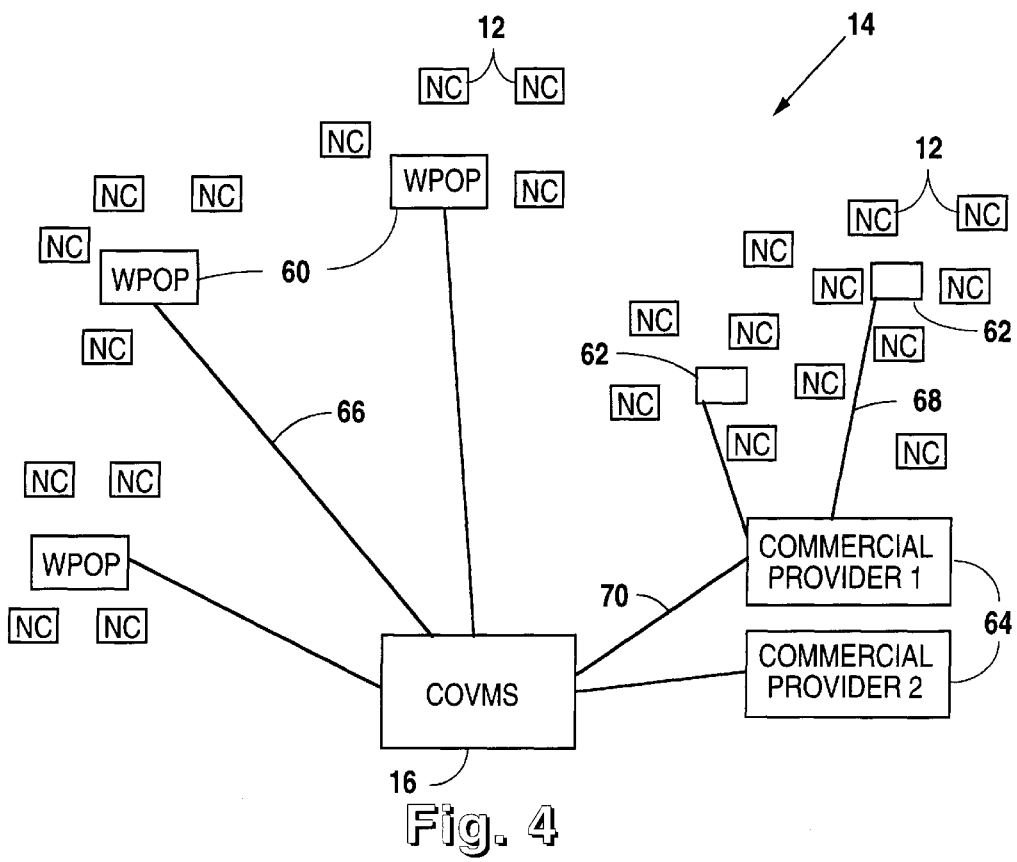
FIG. 4 is a wireless network of the system of FIG. 1, over which the camera elements communicate the images, according to embodiments of the invention.

Referring to FIG. 4, the wireless network 14 is shown connected to the central office video management system (COVMS) 16. The wireless network 14 includes dedicated cell sites 60, third-party cell sites 62, or both. In each case, each cell site 60 or 62 is conventional and includes a base station with antenna connected to the COVMS 16, in the case of the dedicated cell sites 60, and to commercial third-party provider networks 64, in the case of the cell sites 62, by frame relay circuits 66 and 68, respectively. Alternatively, the connections could be other conventional connections, such as T1 line, ATM, or other. The base station antenna of each of the cell sites 60 and 62 is conventionally elevated, for example, by mounting on top of buildings, and receives incoming data, such as image data, from the camera elements 12 corresponding to the particular cell. In the case of the third-party cell sites 62, the camera elements 12 are equipped with RF radios compatible with the commercial provider network 64. The cell sites 62 likewise have mounted antennas and receive incoming data from the camera elements 12. The cell sites 60 are connected directly with the COVMS 16 by the relay circuits 66. The cell sites 62 are connected to the respective commercial provider networks 64. The commercial provider networks 64 are connected by dedicated frame relay circuits 70 to the COVMS 16.

Figure 5:
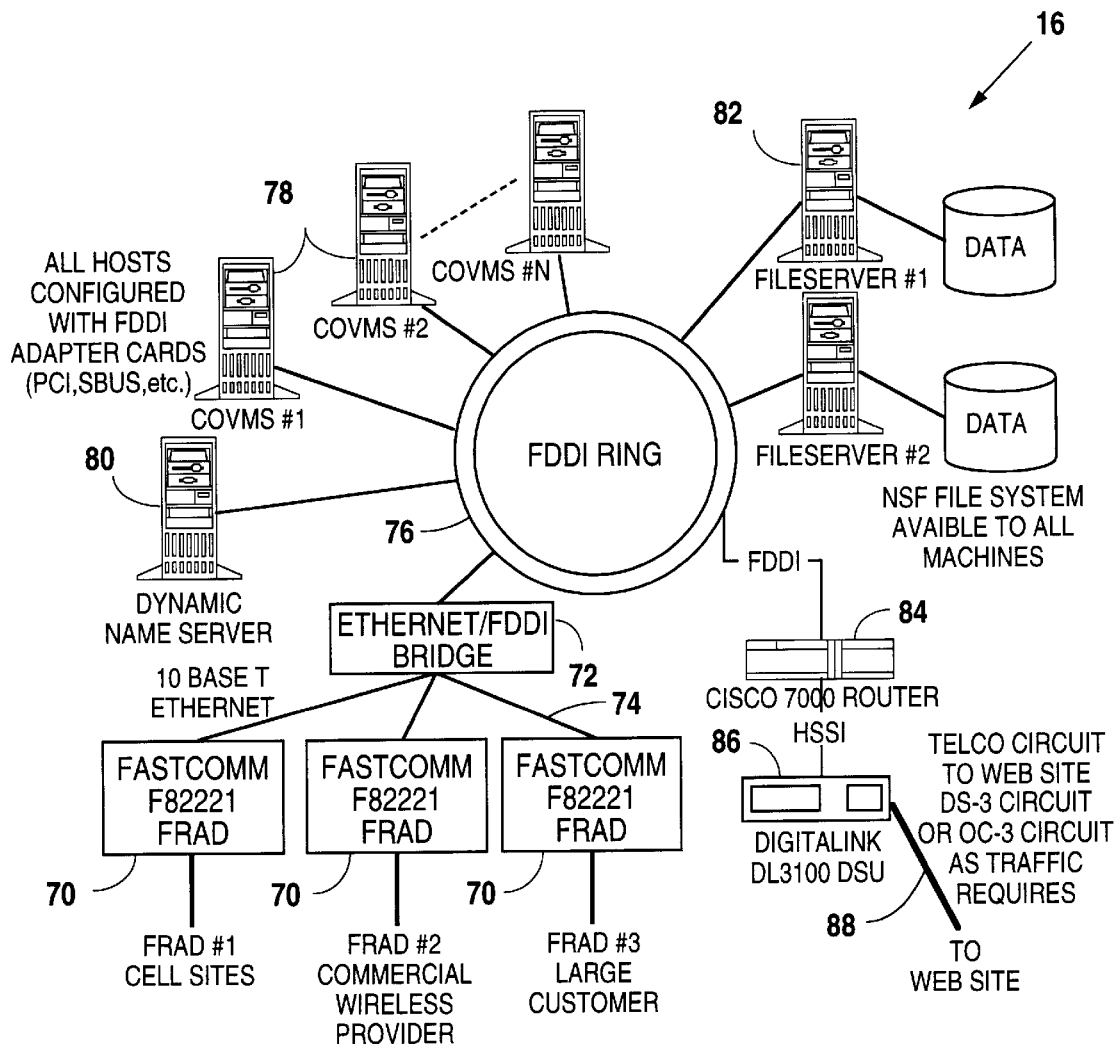
FIG. 5 is a central office video management system of the system of FIG. 1, which selectively receives, manages, and distributes the images received from the camera elements to the multiple user computers, according to embodiments of the invention.

Referring to FIG. 5, the COVMS connects to the wireless network 14 (shown in FIGS. 1 and 4) by one or more frame relay access (FRAD) devices 70. The FRAD devices 70 each connect with a single one of the cell sites 60, the commercial wireless providers 64, or separate dedicated networks. As previously mentioned, each cell site 60 and commercial wireless provider 64 is connected with the COVMS 16 via a frame relay circuit 66 or 70, respectively. The frame relay circuit 66 or 70 interfaces to the FRAD device 70. The FRAD device 70 may, for example, be FRAD device model F822I available from FastCom of Sterling, Va. The FRAD devices 70 are connected to a fiber distributed data interface (FDDI) bridge by a 10 BaseT fast ethernet connection 74. A fiber distributed data interface (FDDI) ring 76 is connected to the FDDI bridge 72. The FDDI ring 76 interconnects one or more host computers 78. Single ones of the host computers 78 service various numbers of the cell sites 60 or 62. Each host computer 78 is, for example, a dual Pentium Pro 180 MHZ system with 128–256 MB of memory running the FreeBSD operating system. The host computers 78 each include disk subsystems, for example, SCSI disks. The capacity of single ones of the host computers 78 will depend on the number of available connection ports and the particular wireless network 14 to which connected. The host computers 78 are particularly sensitive to the available memory and network performance, however, computational horsepower of the computer 78 is of less concern.

In addition to the host computers 78, the COVMS 16 includes one or more dynamic name servers 80, file servers 82, and administrative workstations (not shown). The dynamic name server 80 is a PC-based systems running FreeBDS. For example, the dynamic name server 80 is a Pentium 200 MHZ computer with 64 MB of memory. The file servers 82 include SCSI disk subsystems and are, for example, Pentium Pro 150 MHZ computers with 128 MB of memory. The file servers 82 include high end SCSI adapters attached to 2–8 Gbyte of the SCSI disks. The file servers 82 run the Linux operating system. The file servers 82 may choose to use RAID arrays if the scale of the COVMS 16 warrants such use. Additionally, the file servers 82 may use DAT tape and WORM drives to perform periodic system backups.

The administrative workstations (not shown) are connected with the system 16 and allow system administrators and technicians to monitor network status and make adjustments. The administrative workstations are, for example, Pentium 200 MHZ systems with 32 MB of memory. The administrative workstations include high end graphics display. The Linux, FreeBSD, or Windows NT operating systems are run on the administrative workstations. The graphics components of the administrative workstations are, for example, 21 inch 0.26 dpi RGB color monitors and display adapter cards, such as the Matrox Millennium display adapters with 8 MB of WRAM memory. High resolution display capabilities are necessary for the administrative work stations because the workstations must periodically be employed to evaluate image quality of the system 10 (shown in FIG. 1).

The FDDI ring 76 of the COVMS system 16 is connected by fiber distributed data interface with a suitable router, such as a Cisco 7000 router 84. Via the router 84, the COVMS system 16 interfaces to a wide area network (WAN) link, for example, by a T3 digital service unit/channel service unit (DSU/CSU), such as the Digital Link DL3200 T3 SMDS/ATM DSU available from Digital Link Corporation of Sunnyvale, Calif. The Cisco 7000 router has a protocol interface module that allows it to be directly connected to the FDDI ring 76. The DSU provides channelization up to the full 45 Mbps bandwidth of the T3 WAN link. The router 84 interfaces next to the DSU by a high speed serial interface (HSSI) connection.

A web site connection is made to the DSU/CSU 86. The web site connection 88 may be a T1 or T3 connection. A tiered T3 connection is required for the very high band width of the circuit (up to 45 Mbps). The T1 connection may be suitable for the system 16 when small.

Referring back to FIG. 1, the World Wide Web server 18 is any of a variety of computers capable of serving as a server computer connected to the Internet or some other network 20. Information available from the World Wide Web server 18 is accessed by a web-enabled computer 22. The web-enabled computer 22 may be a personal computer, network computer, or other device that is connected with the network 20. The computer 22 is capable of accessing information available over the network 20 from the World Wide Web server 18, for example, by operating a web browser software, a dedicated image display device or some other suitable display mechanism. The World Wide Web server 18, the network 20, and the computer 22, together with their interconnection, are conventional and known to those skilled in the art.

Operation of the Remote Viewing System

Referring to FIGS. 1–5, in conjunction, in operation, each of the cameras 12 acquires images at the site at which located and converts those images to digital data information. At the camera 12, the digital data is processed, compressed, and then transmitted over the wireless network 14 to the COVMS 16. The cameras 12 use the TCP/IP protocol suite for communications over the wireless communications links of the wireless network 14. Each of the cameras 12 is configured, prior to being deployed at a location, with an ID record that includes geographical information about the location of the camera 12, the camera hardware and system settings of the camera 12, an IP address, and a primary and secondary COVMS 16 for connection upon startup. If the camera 12 has powered up and acquired network connections, the camera 12 begins to periodically send image data to the COVMS 16 and may also accept various control commands from the COVMS 16.

The cameras 12 communicate with the COVMS 16 over the wireless network 14. As previously mentioned, the wireless network 14 may be cell sites 60 which communicate directly with the COVMS 16 dedicated for use with the cameras 12 or commercial wireless data communications providers 64 which communicate with the COVMS 16 or some other direct connection of a third party to the COVMS 26. With respect to the dedicated cell sites 60 and the cameras 12 and the wireless network 14 related thereto, the base station antenna of each of the cell sites 60 receives image data from the camera 12 using a DDCIP protocol. That protocol facilitates TCP/IP networking over spread spectrum radio links. In particular, the DDCIP protocol follows the OSI network model. The ARP protocol in the Ethernet environment, however, is replaced with a static mapping mechanism specific to the radio frequency environment, e.g., the ARP protocol is replaced with a static routing table and routing according to the table. The DDCIP protocol accommodates routing from the radio frequency onto the wireline protocol. As for transmissions under the DDCIP protocol, the protocol uses primarily UDP for sending data and implements its own data validity and error checker. The protocol's method of compensating for errors is to re-send only those pieces of data within a transmitted file that was received in error.

The cameras 12 in communication with the commercial wireless data communications providers network 64 communicates image data over the providers network 64. The providers network 64 connects to a frame relay circuit 70 that connects the COVMS 16 and the providers network 64. Other dedicated connections with the COVMS 16 (not shown in the Figures) are directly connected to the COVMS 16 and communicate with the COVMS 16 in similar fashion. The COVMS 16 processes the images and then transfers them to the storage facility for archive, to the World Wide Web 18, and to dedicated connections with the COVMS 16 of certain users, if any. The COVMS 16 acts substantially as a switch to direct the output of multiple ones of the cameras 12 in operation at any time to multiple users accessing the images. The COVMS 16 also performs image processing operations on the images. Particularly, the COVMS 16 receives each image, as compressed and transmitted by the cameras 12, and decodes the image data. The COVMS 16 then decompresses the images and provides post-processing operations to compensate for lighting conditions and other factors. Further, the COVMS 16 compresses the image information according to industry-standard image file formats, for example, JPEG formats, and passes the information to the World Wide Web server 18. Other operations may take place at the COVMS 16, such as, for example, specialty image processing like object detection, object count, event recognition, and others.

Through the World Wide Web server 18, the image information is made available in the industry standard format for access over the network 20 by the computer 22. For example, the computer 22 may access the image information over the Internet using the World Wide Web and standard web browser software. Alternately, images may be accessed directly over dedicated networks.

Camera Element Operation

Figure 6:
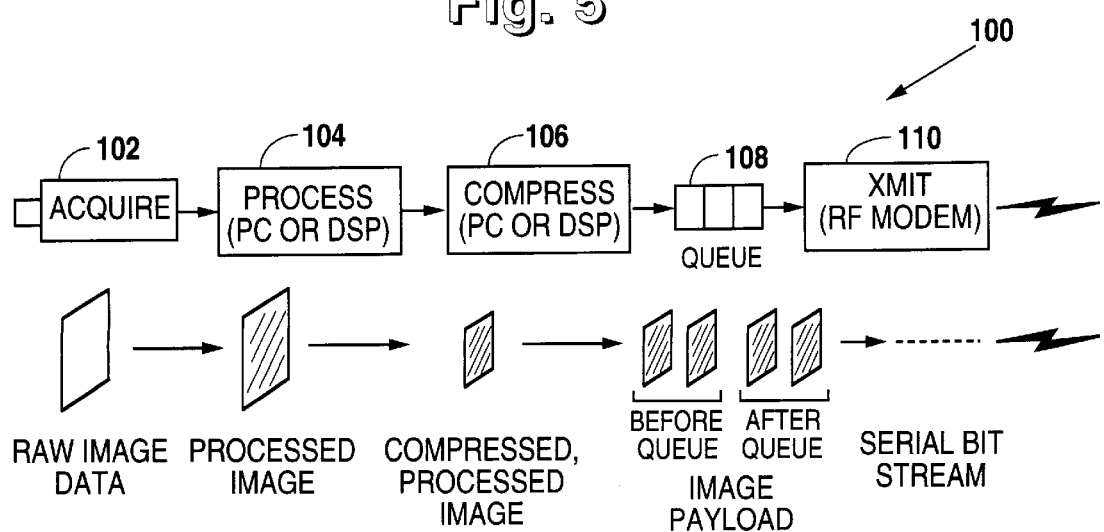
FIG. 6 is a method of operation of an image acquisition cycle of the camera element of FIG. 2, according to embodiments of the invention.

Referring to FIG. 6, in conjunction with FIGS. 1 and 2, each of the camera elements 12 operates according to a particular image acquisition cycle, identified in the Figure as process 100. In a step 102 of the process 100, the camera of the camera element 12 acquires raw image data. Because the camera 24 is a digital camera, the image data is digital data. The digital image is captured by the CCD imaging element of the camera 24. Image capture rates may vary according to desired operations, particularly, the camera 24 has four operating modes and three sub-modes. The four operating modes are "broadcast", "demand-driven", "trigger-driven", and "event-driven". The three sub-modes are "around", "before", and "after". The particular operating mode determines what is the actuating event that causes an image to be transmitted by the camera element 12 over the wireless network 14. The particular sub-mode determines how many images are transmitted in the instant, and whether the images are captured before, after, or around the actuating event. The set of images transmitted as a result of an actuating event is referred to as the "image payload". The sub-modes and respective sub-mode parameters additionally determine the size of the image payload in any instance. Notwithstanding the particular operating mode and sub-mode in any case, the digital image data is passed by the camera 24 to the video digitizer 26. The digital image data may be maintained in the video digitizer 26, for example, in the frame store thereof, or brought into main memory of the processor card 28 for processing.

In a step 104, the digital image data is processed. The particular processing depends upon the camera element 12 and the particular programming and instructions received from the COVMS 16. The processing step 104 may include various operations ranging from color channel separations, to complex filtering, to motion detection operation, and others. If the camera element 12 is in the event-driven mode (later discussed in more detail), the image event may at this time be registered. Registry of the event results in transmission of the image payload, once the necessary images have been captured by the camera element 12.

In a step 106, the processed image data is compressed for transmission over the wireless network 14. In the step 106, the processor card 28 compresses the image according to the assigned codec for the particular camera 24. The COVMS 16 can upload different codec configurations for the camera element 12 for different applications or changing image conditions. The codec can be any of a variety of possibilities, for example, wavelet based compression algorithms, DCT based compression algorithms, JPEG, MPEG, or others. In any event, the codec compresses the image data to suitable size for rapid transmission over the wireless network 14.

In a step 108, the compressed image is placed in one of two transmit output queues. The two output queues are a "before" output queue and an "after" output queue. The before output queue is used for images acquired before the actuating event, and the after output queue is used for images acquired after the actuating event before the image payload is transmitted. The image payload consists of the contents of the before and after queues at the transmit time, as determined by the mode parameters (as more particularly hereinafter discussed). Whether or not particular image data is transmitted to the COVMS 16 depends on the sub-mode of the camera element 12 and the image's position in the before and after queues.

In a step 110, the compressed image in the queues is transmitted over the wireless network 14. In the step 110, the actuating event that causes the camera element 12 to transmit the image payload depends upon the operating mode. The actuating event can be either an update timer or clock (i.e., broadcast mode), an incoming image request from the COVMS 16 (i.e., demand-driven mode), an external triggering event (i.e., trigger-driven mode), or an event detected by the camera element 12 (i.e., event-driven mode). The sub-mode (i.e., either around, before, or after) determines how many images shall make up the image payload and from which queues those images come. The transmit process converts the image payload into a serial bit stream and then transits the stream over the wireless network 14 using the remote communications link module 30 and the antenna 32.

Figure 7:
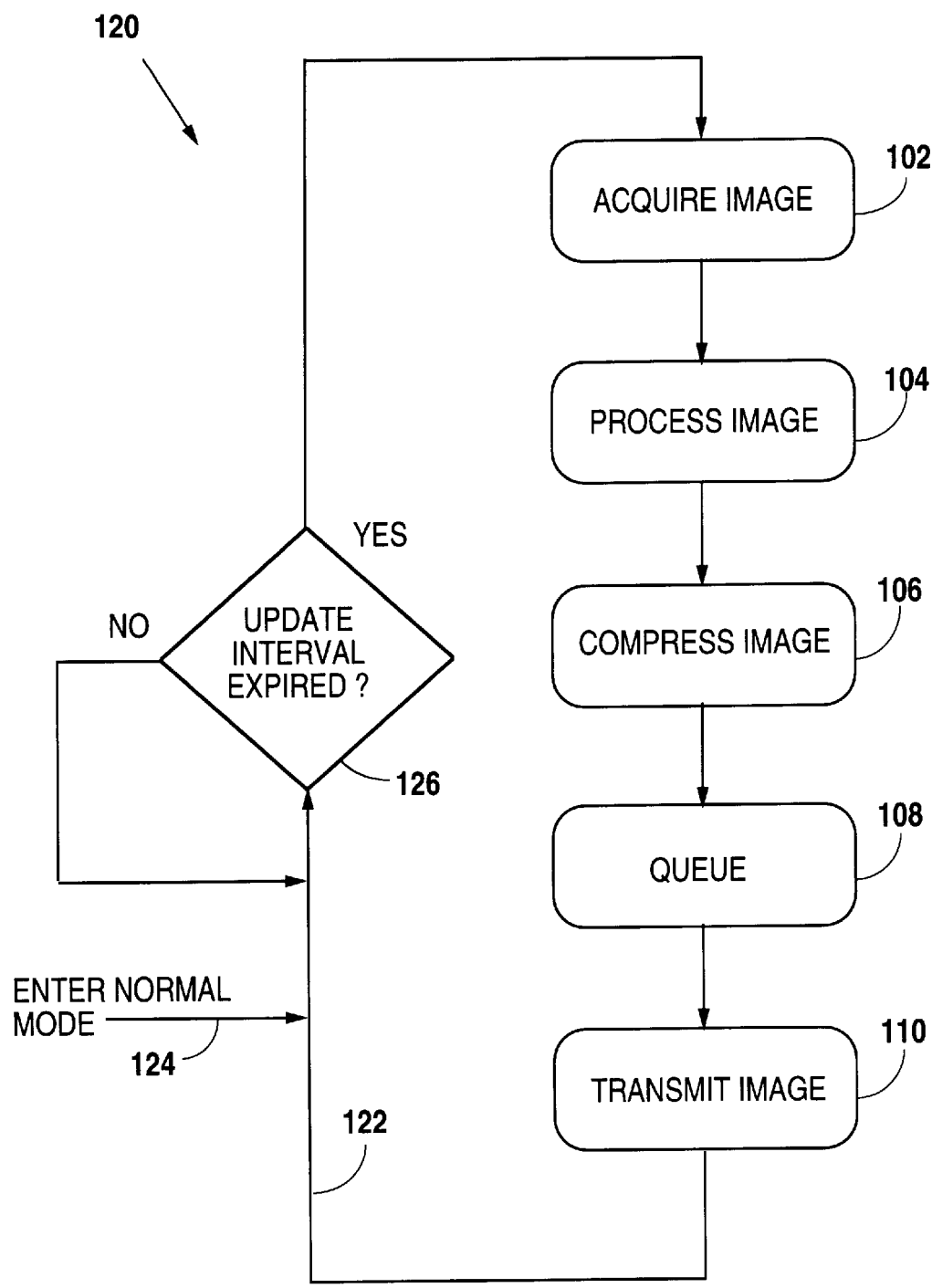
FIG. 7 is a simplified flow diagram of a method of operation of the camera element of FIG. 2, according to embodiments of the invention.

Referring to FIG. 7, regardless of the particular mode of the camera element 12, the camera element 12, once it has been initialized, proceeds through a process identified by 120. The process 120 is, in effect, that just described with reference to FIG. 6, with repetition. The process 120, thus, includes the steps 102, 104, 106, 108, and 110 as described. Additionally, however, the process 120 includes a return path 122. Over the return path 122, a change of mode 124 may be indicated and a determination of whether there has been expiration of an update interval in a step 126 is made prior to returning to the step 102. The process 120 is followed by the camera element 12 in each of the four modes, however, the different modes alter the order and frequency in which the steps 102, 104, 106, 108, 110, 122, 124, and 126 occur.

Figure 8:
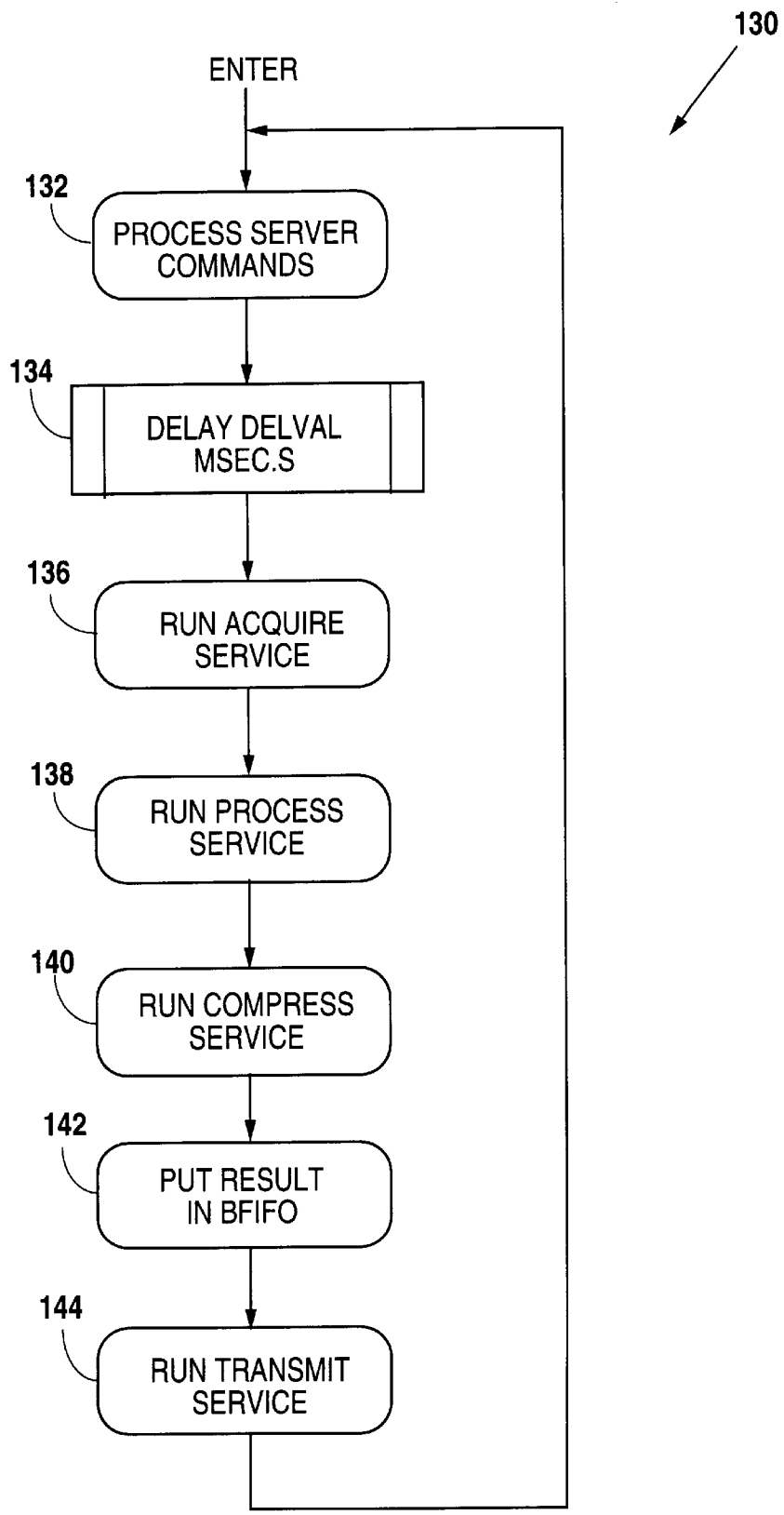
FIG. 8 is a flow diagram of a broadcast mode sequence of the camera element of FIG. 2, according to embodiments of the invention.

Referring to FIG. 8, in the broadcast mode sequence 130, the camera element 12 automatically sends the image payload to the COVMS 16 at the end of each update interval. The update interval programmed into the camera element 12 by the COVMS 16 is used to set a system timer to trigger transmission at the end of each interval. The camera element 12, once connected to the system 10 and initialized, retrieves the update interval value from the particular ID record for the camera element 12 and the camera element 12 commences the broadcast mode sequence 130. The broadcast mode sequence 130 proceeds with a process server command step 132. Thereafter, the sequence 130 proceeds through a delay step 134, a run acquire service step 136, a run process service step 138, and a run compress service step 140. The result of those steps 132, 134, 136, 138 and 140 are put in the before queue, which is a FIFO buffer, in a step 142. In a step 144, the run transmit service step 144 occurs and the sequence 130 returns to commencement. The sequence 130 is repeated every update interval period. The effect of the update is that the camera element 12 sends a new image for receipt by the wireless network 14 once every update. In broadcast mode, the image payload is always equivalent to one image.

Figure 9:
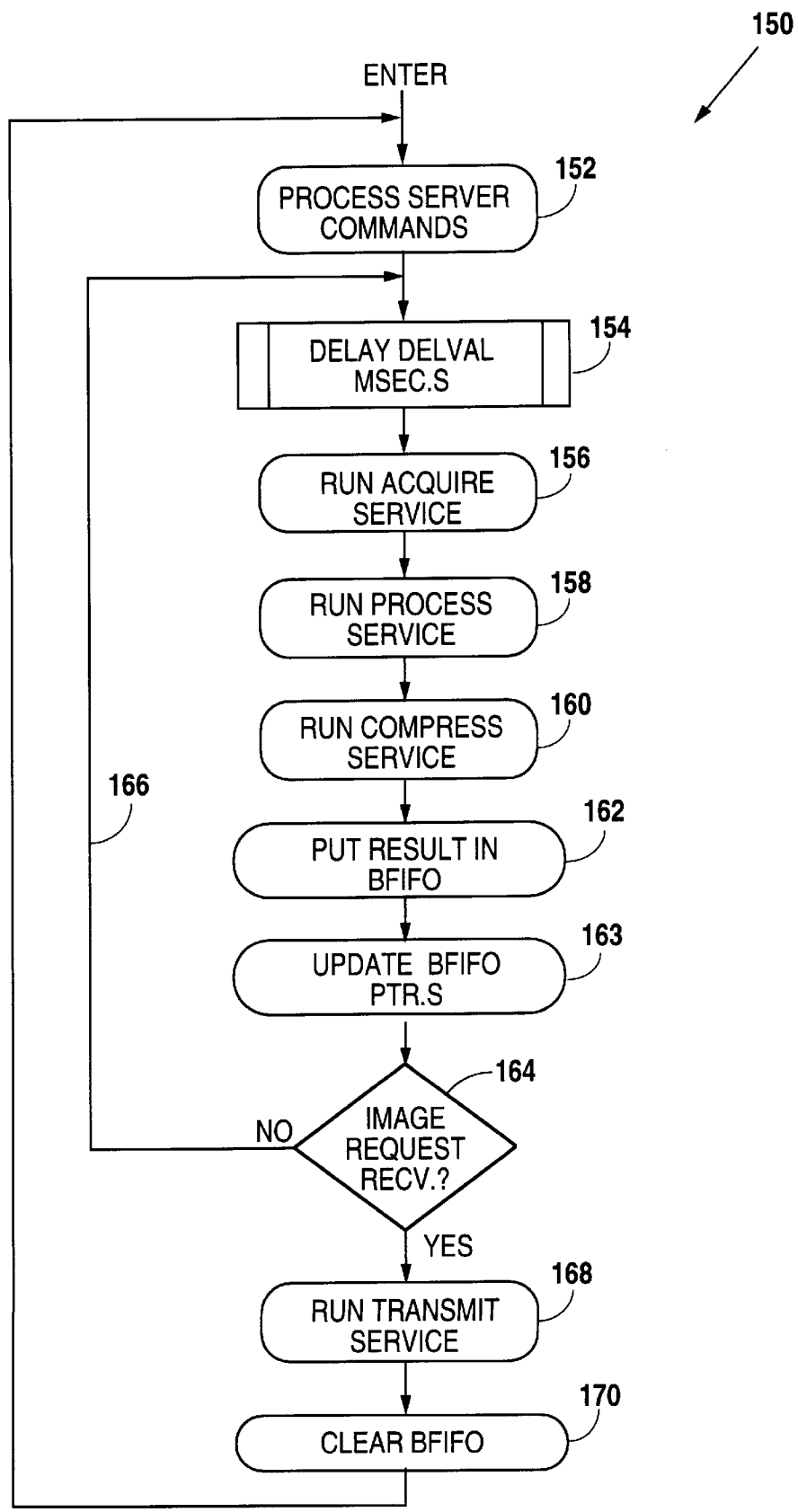
FIG. 9 is a flow diagram of a demand-mode sequence of the camera element of FIG. 2, according to embodiments of the invention.

Referring to FIG. 9, the demand-mode sequence 150 of the camera element 12 causes the camera element 12 to act, in effect, like a server, sending the image payload to the COVMS 16 only when requested by the COVMS 16. In the sequence 150, the camera element 12 listens for an image request command on the port of the COVMS 16 for the camera element 12. When such a request command is detected, the camera element 12 transmits the image payload. The sequence 150 proceeds first by a process server command step 152. The camera element 12 then runs an image acquisition cycle of a delay step 154, a run acquire service step 156, a run process service step 158, and a run compress service step 160, and the result is placed in the before queue in step 162. The before queue is thereafter updated in a step 163. The sequence 150 then checks for receipt by the camera element 12 of an image request in step 164. If no image request has been received at this step 164, the sequence 150 returns in step 166 to again commence the image acquisition cycle. If, however, an image request has been received by the step 164, the camera element 12 proceeds with a run transmit service step 168 in which the image payload is transmitted by the camera element 12. Thereafter, the before queue is cleared in a step 170 and the sequence 150 returns to commencement. It is of note that the demand-driven mode always transmits some number of images acquired before the actuating event actually occurs.

Figure 10:
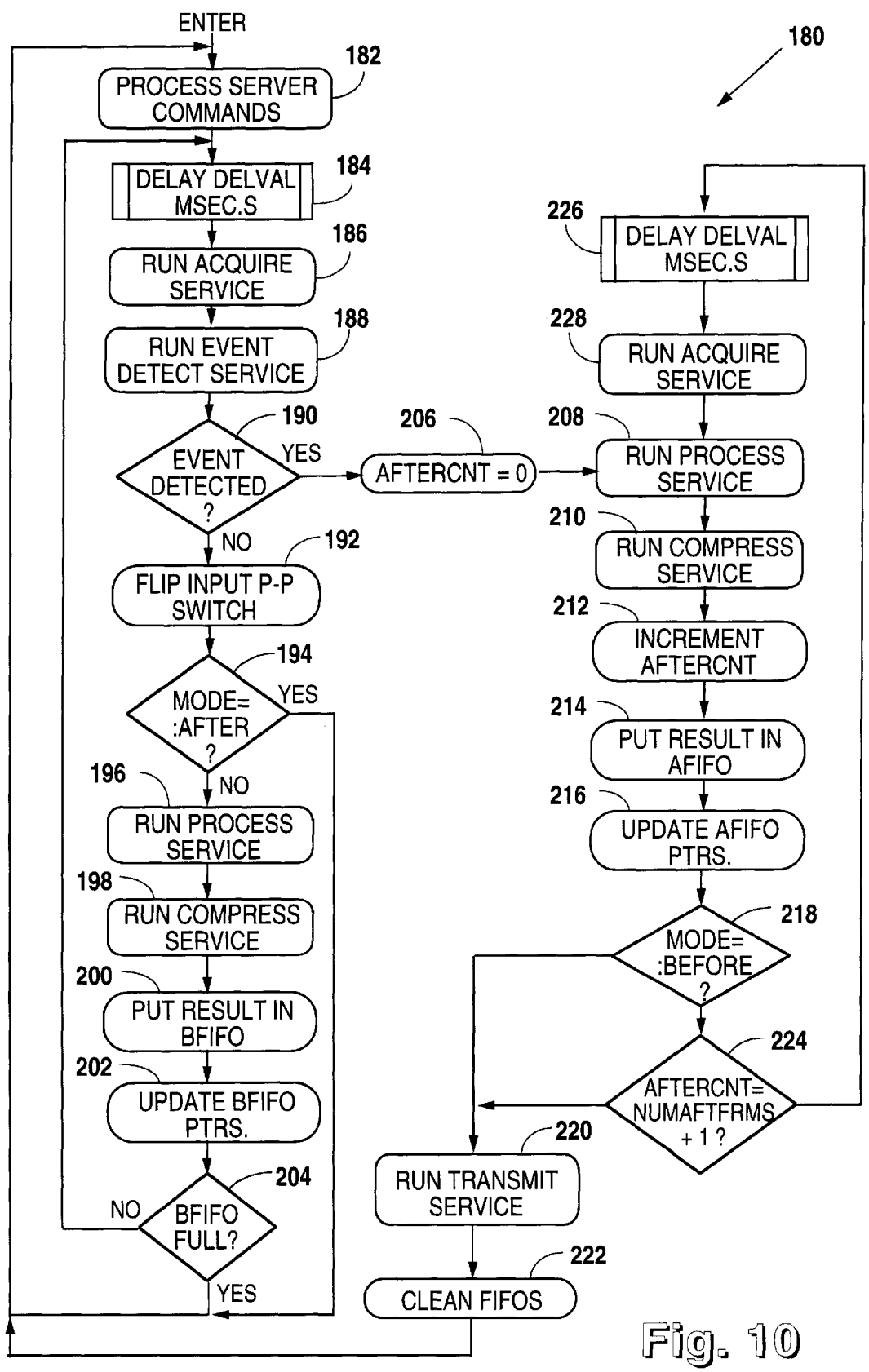
FIG. 10 is a flow diagram of an event-driven mode sequence of the camera element of FIG. 2, according to embodiments of the invention.

Referring to FIG. 10, an event-driven mode sequence 180 triggers transmission of the image payload by the camera element 12 upon the occurrence of some event recognized by the camera element 12. The camera element 12 repeatedly runs the image acquisition cycle, but without the transmission step 144 at each cycle as in the broadcast mode sequence 130 (shown in FIG. 8). The event upon which transmission is to occur is detected by an image processing application running at the camera element 12. The image processing application examines each acquired image for the event. When the event is detected, the camera element 12 begins transmitting the image payload after the camera element 12 has captured all required images, as determined by the sub-mode (as later discussed in more detail). The event driven mode sequence 180 proceeds with a process server commands step 182. The sequence 180 then continues through a delay step 184, a run acquire service step 186, and a run event detect service step 188.

In a step 190, it is determined whether the event is then detected. If the event is not then detected, the sequence 180 continues through a flip input p—p switch step 192. After the step 192, a step 194 determines whether the sub-mode is "after". If not "after", then the sequence 180 continues to a run process service step 196 and a run compress service step 198. The result is put in the before queue in a step 200, and the before queue is updated in a step 202. Thereafter, a determination is made in a step 204 whether the before queue is full. If the before queue is full, the sequence 180 returns to commencement. If the before queue is not full, then the sequence 180 returns to the delay step 184.

If in the step 190 it is determined that the event is then detected, a counter is set to 0 in a step 206. The sequence 180 then proceeds to a run process service step 208 and a run compress service step 210. The counter is then incremented in a step 212. The result of the run compress service step 210 is put in the after queue in a step 214. In a step 216, the after queue is updated. A determination is then made in a step 218 whether the sub-mode is "before". If it is "before", then the sequence 180 proceeds to a run transmit service step 220, followed by a clear queues step 222 and return to commencement. If the sub-mode is not "before", a test of the counter is made to determine if it equals a particular number of format frames plus 1. If yes, then the sequence 180 continues to the run transmit service step 220 and on. If the counter is not equal to the particular number of format frames plus 1, then the sequence 180 passes to a delay step 226 and a run acquire service step 228. After the run acquire service step 228, the sequence 180 proceeds to the run process service step 208 and continues thereafter. It is notable that, in the event-driven mode sequence 180, each time the event is detected the camera element 12 transmits the image payload.

Figure 11:
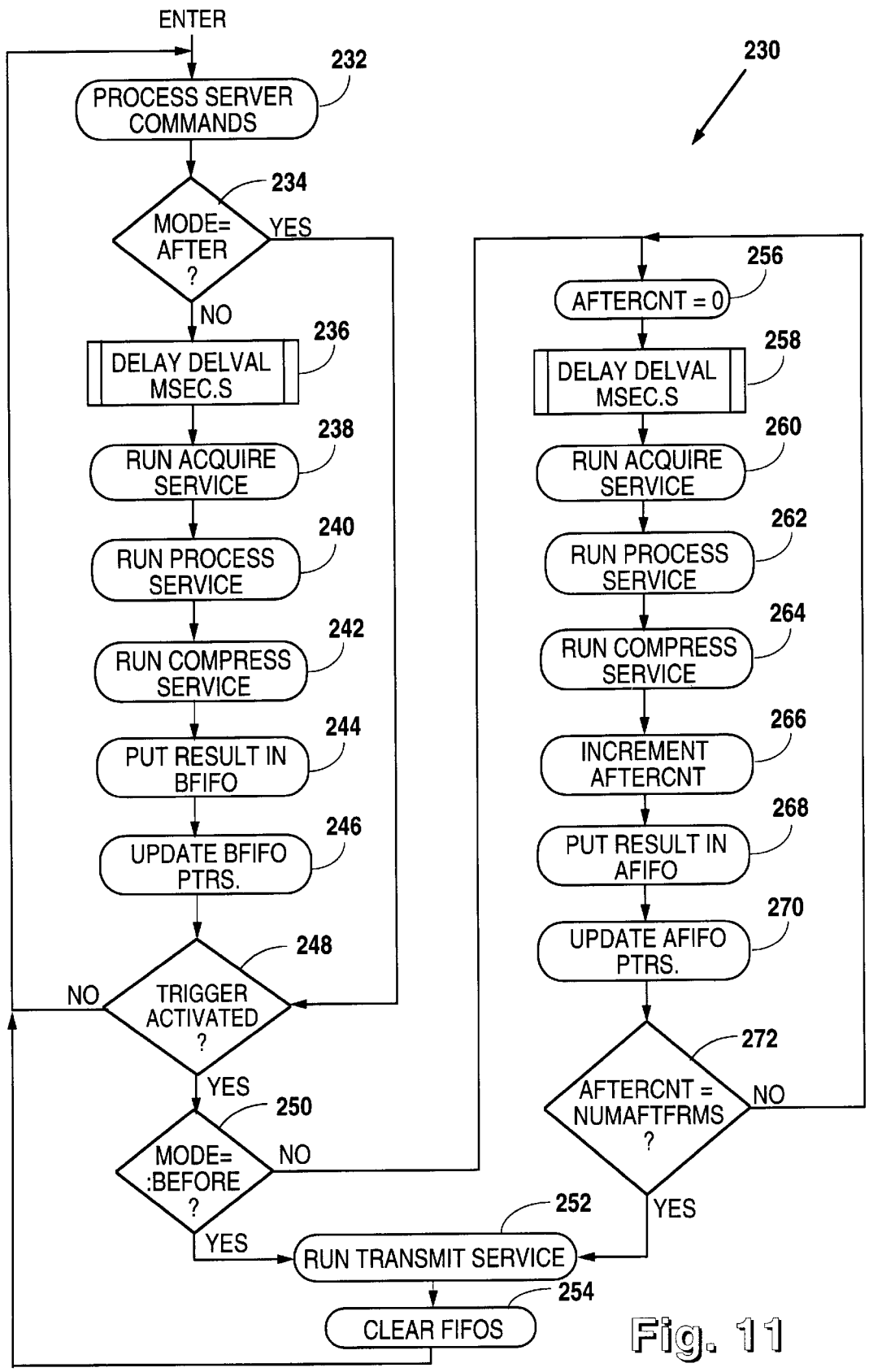
FIG. 11 is a flow diagram of a trigger-driven mode sequence of the camera element of FIG. 2, according to embodiments of the invention.

Referring to FIG. 11, a trigger-driven mode sequence 230 includes transmission of the image payload controlled by an external triggering device. Operation of the sequence 230 is similar to the event-driven mode sequence 180 except that the triggering device in the trigger-driven mode sequence 230 may be an external switch, road sensor, or other particular external triggering event. In the sequence 230, the camera element 12 transmits the image payload after the trigger event is detected and after the camera element 12 has captured all required images, as dictated by the sub-mode. The sequence 230 commences with a process server command step 232. Next, a mode determination step 234 assesses whether the sub-mode is "after". If not "after", the sequence 230 proceeds through an image acquisition cycle including a delay step 236, a run acquire service step 238, a run process service step 240, and a run compress service step 242. Results of the cycle are put in the before queue in a step 244, which is updated in a step 246.

A step 248 follows in which it is determined whether the trigger event has occurred. If the trigger event has not occurred, the sequence 230 returns to commencement. If the trigger event has occurred and is detected in the step 248, again the sub-mode is assessed in a step 250, this time for "before" sub-mode. If the submode determined in the step 250 is "before", then the sequence 230 proceeds to a run transmit service step 252 followed by a clear queues step 254, with return to commencement of the sequence 230. If the mode assessment step 250 determines that the sub-mode is not "before", then the sequence 230 proceeds to a set counter to zero step 256, followed by a delay step 258. The sequence 230 then proceeds through a run acquire service step 260, a run process service step 262, and a run compress service step 264. After the run compress service step 264, the counter is incremented in a step 266. The result of the run compress service step 264 is placed in the after queue in a step 268, and the queue is updated in the step 270.

A determination is made in a step 272 whether the counter then equals a particular number of format frames for the camera element 12. If no, the sequence 230 returns to the step 256 to commence another cycle. If the equivalency of step 272 is yes, the sequence 230 proceeds to the run transmit service step 252. Again, after the step 252 the step of clearing the queues 254 occurs and the sequence 230 recommences. Thus, when the trigger event is detected, the camera element 12 transmits the image payload after the images dictated by the sub-mode are captured.

Figure 12:
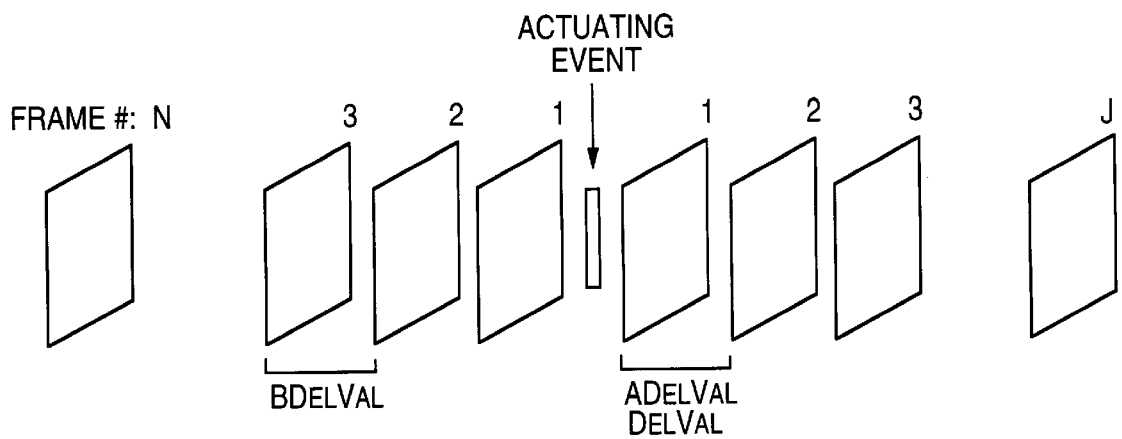
FIG. 12 is a simplified illustration of an "around" sub-mode of the camera element of FIG. 2, according to embodiments of the invention.

As previously mentioned, the sub-mode of the camera element 12 dictates which images and how many of those images are transmitted in each image payload. Referring to FIG. 12, the sub-mode "around" includes the capture and transmission by the camera element 12 of some number of images both before and after an event that actuates the transmission of the images. The number of frames captured on either side of the event is programmable, and is preferably a small number due to memory constraints. The sub-mode has four parameters: the number of the before frames captured (N), the number of after frames captured (J), the BDelVal, and the ADelVal. The BdelVal and ADelVal control how much time the camera element 12 allows between captured frames. The value is expressed in milliseconds. Compressed images acquired before the actuating event are placed in the before queue. Images acquired after the actuating event are placed in the after queue. When the run transmit service step 220 or 252 in the demand-driven mode sequence 180 or the event-driven mode 230, respectively, occur, everything in both the "before" and "after" queues is transmitted, regardless of the particular operational mode.

Figure 13:
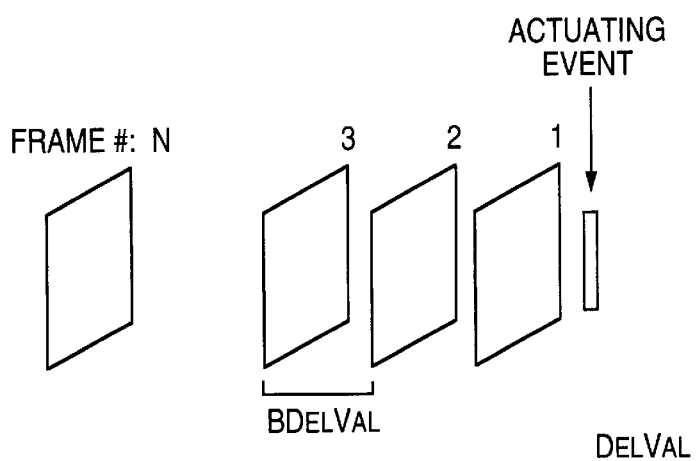
FIG. 13 is a simplified illustration of a "before" sub-mode of the camera element of FIG. 2, according to embodiments of the invention.

Referring to FIG. 13, the camera element 12 captures and transmits some number of images before the event that actuates the transmission of the images in the "before" sub-mode. In the "before" sub-mode, the number of frames captured is programmable, but is preferably a small number because of memory constraints. The "before" sub-mode has two parameters: the number of "before" frames to capture (N) and the BDelVal value. The number of "after" frames to capture (J) and ADelVal or not used and set to zero. The BDelVal value controls the amount of time allowed between captured frames and is expressed in milliseconds. Compressed images acquired before the actuating event are placed in the "before" queue.

Figure 14:
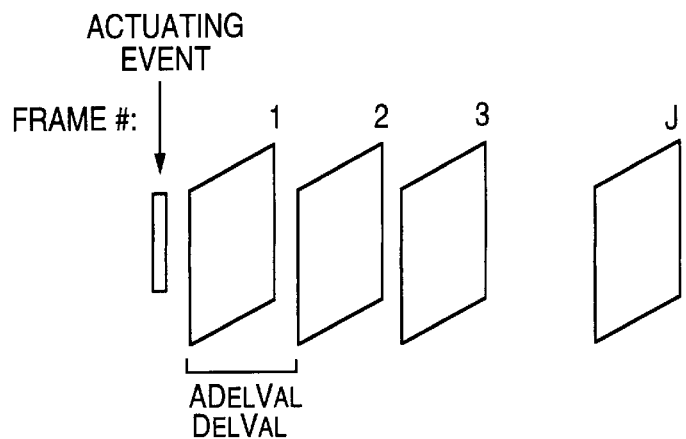
FIG. 14 is a simplified illustration of an "after" sub-mode of the camera element of FIG. 2, according to embodiments of the invention.

Referring to FIG. 14, the camera element 12 captures and transmits some number of images after the event that actuates transmission in the "after" sub-mode. The number of frames captured is programmable, and is preferably a small number, for example, one frame. The "after" sub-mode has two parameters: the number of "after" frames to capture (J) and the ADelVal value. The ADelVal dictates how much time the camera element 12 allows between captured frames, in milliseconds. When the operating mode is "broadcast", the BDelVal and the ADelVal parameters are the same. Image payloads acquired after the actuating event are placed in the after queue. When the number of images in the "after" queue reaches the "after" frames to capture value (J), the camera element 12 begins transmitting the image payload.

COVMS Operation

Referring to FIGS. 1–5 throughout the remaining discussion, the COVMS 16 (shown in FIG. 1) receives and decodes the images from the wireless network 14 from all cell cites 60 and 62 and related camera elements 12. The COVMS 16 then sends the resulting images to the server 18 so that the computers 22 can access the images over the network 20. There are four distinct operations that take place in the COVMS 16. The operations are the Business Manager, the CommLink Manager, the Image Processing Manager, and the Web Server Communication Manager. The Business Manager is the fundamental operation of the COVMS 16 that supports all operations. The CommLink Manager, the Image Processing Manager, and the Web Server Communications Manager are, therefore, referred to collectively herein as the "Sub-processes" (although referred to by the term "Sub-processes," these processes should not be confused with further sub-processes of the Image Processing Manager, specifically, which are distinct sub-operations within the particular Image Processing Manager Sub-process). The methods of the operations of the Business Manager and the Sub-processes are as follows:

(1) The Business Manager:

The Business Manager performs several operations. In particular, the Business Manager initializes the COVMS 16, starts-up the Sub-processes, monitors the COVMS 16 performance, performs central data base maintenance, manages communications between and among the Sub-processes and the Business Manager, manages communications between the COVMS 16 and other COVMS's, if more than one, and manages customer connections and web site connections to the COVMS 16.

i) System Initialization

Figure 15:
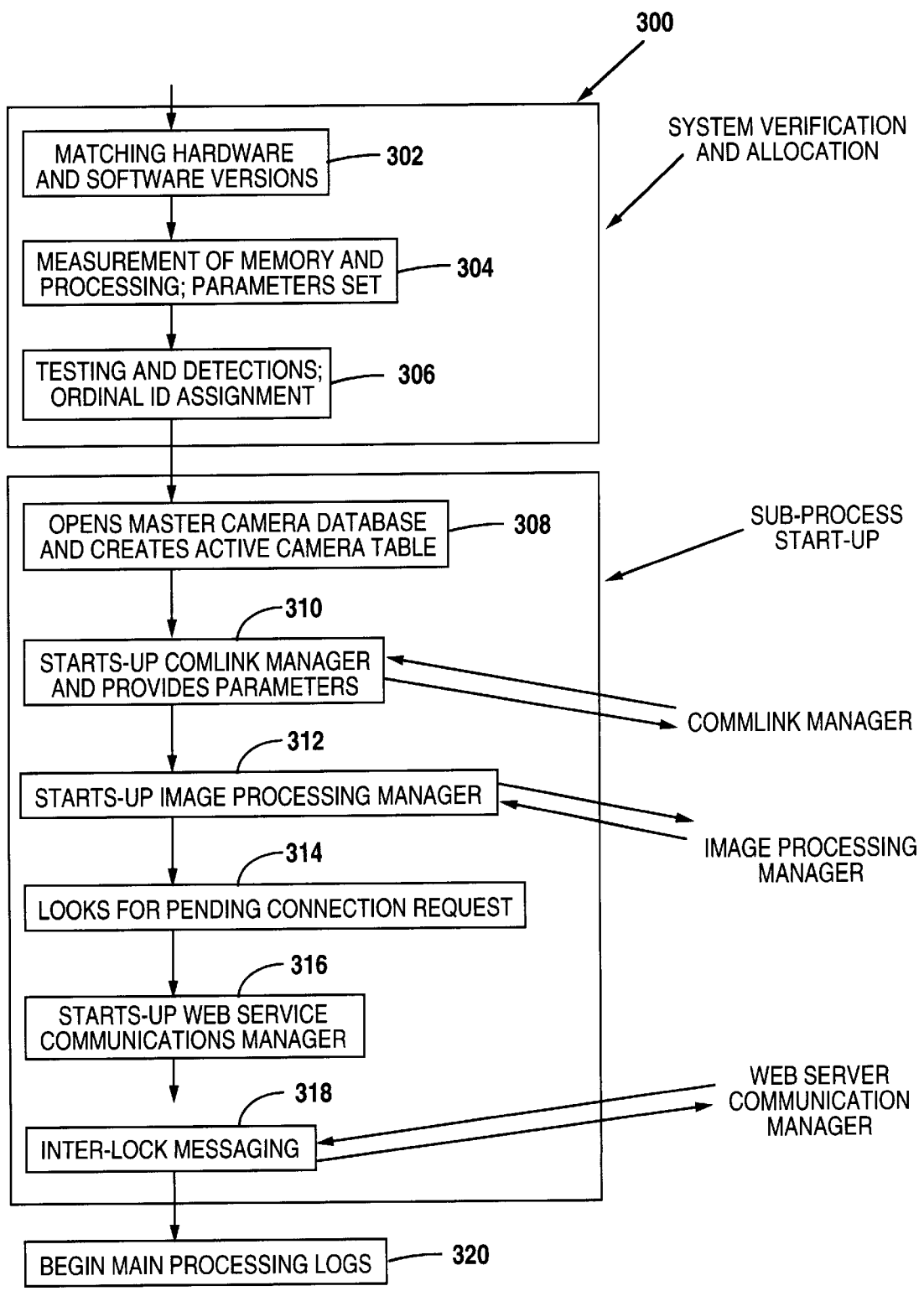
FIG. 15 is a flow diagram of an initialization method of the central office video management system of FIG. 1, according to embodiments of the invention.

Referring to FIG. 15, upon booting the COVMS 16, the COVMS 16 initially proceeds through a method 300 of initialization of the system 10. The method 300 includes system verification and resource allocation and Sub-process start-up functions. The method 300 proceeds with a step 302 in which the Business Manager checks and matches hardware and software release versions of the system 10 in order to ensure that all are properly compatible and supported. In a step 304, the Business Manager measures memory and processing capabilities of the system 10 and, based on the measurements, operating parameters are set by the Business Manager that determine the number of the camera elements 12 the COVMS 16 can support. Resources of the network of the COVMS 16 are tested in a step 306. In the step 306, the COVMS 16 determines whether there are one or more of the host computers 78 of the COVMS 16. If there are more than one of the host computers 78 in the COVMS 16, then each is assigned an ordinal ID from one of the host computers 78 arbitrarily designated as the master of the host computers 78.

ii) Sub-processes start-up

Next, the Sub-processes are started by the Business Manager. In a step 308, the Business Manager opens a master database (the "Master Camera Element Database") for the camera elements 12 for random access thereto and creates a table (the "Active Camera Element Table") of the camera elements 12 that are active in the system 10 in the COVMS 16 memory. The Business Manager next starts-up the CommLink Manager in a step 310. In the step 310, the Business Manager provides to the CommLink Manager various operating parameters, including the number of camera element 12 link processes to create, memory limitations, and pointer to the Master Camera Element Database and the Active Camera Element Table. Communications with the CommLink Manager in the step 310 are symbolized in FIG. 15 by the arrows 310'. The CommLink Manager operations are discussed in Section (2), below.

In a step 312, the Business Manager starts-up the Image Processing Manager. Various operating parameters are passed between the Business Manager and the Image Processing Manager in the step 312, which are symbolized in FIG. 15 by the arrows 312'. The Image Processing Manager operation is discussed in Section (3), below.

In a step 314, the Business Manager looks for any pending connection requests from any of the computers 22. The pending connection requests, if any, are available to the Business Manager over the network 20, either through a web site of the World Wide Web server 18 for computers 22 that communicate over the Internet, through a direct connection to the network 20 for computers 22 that may have such direct connection, or from both, as the case may be for multiple computers 22. The Business Manager establishes links corresponding to the pending connection requests in the step 314. Information about each of the links is placed in a table (the "Active Output Link Table") of active output links for the camera elements 12. The Business Manager maintains the Active Output Link Table.

In a step 316, the Business Manager starts-up the Web Server Communications Manager. Operations of the Web Server Communications Manager are discussed in Section (4), below. In a step 318, the Web Server Communications Manager makes several requests of the Business Manager through inter-task messaging, symbolized in FIG. 15 by the arrows 318'. The Business Manager fills an Image Output Mapping Table created by the Web Server Communications Manager in the step 318. In a step 320, the Business Manager begins a main processing loop of normal operations.

iii) Normal operations

Figure 16:
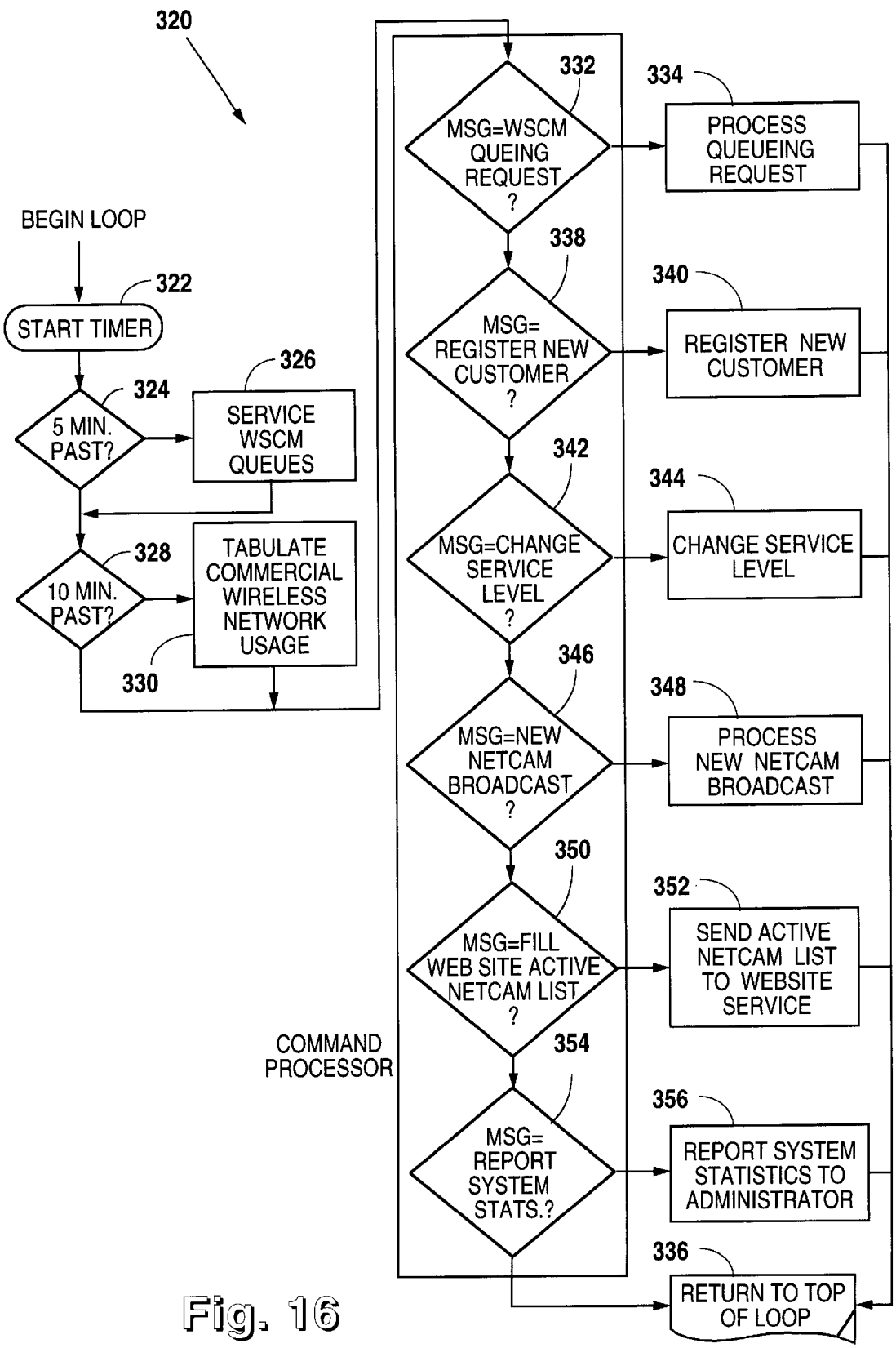
FIG. 16 is a method of normal operations of the Business Manager main processing loop of the central office video managemnent system of the system of FIG. 1, according to embodiments of the invention.

Referring to FIG. 16, a method of the main processing loop of normal operations of the Business Manager is indicated generally by the number 320 (i.e., the method is the step 320 of FIG. 15). In the loop of the method 320, the Business Manager acts essentially as a command server, processing request messages sent to the Business Manager from resources of the system 10 and from the web site of the World Wide Web server 18 and from the computers 22. The method 320 proceeds with a step 322 of starting a timer.

In a step 324, a determination is made whether 5 minutes have passed since the start of the timer in the step 322. If 5 minutes have not passed, the method 320 proceeds to a step 326 of servicing the Web Server Communications Manager queues. In the step 326, the Business Manager creates and maintains a table of image output queues for the Web Server Communications Manager. In this respect, the Business Manager creates the queues, hands off pointers to the queues to the Web Server Communications Manager, and monitors status of the queues. Several statistics monitored for status include the queue size (i.e., the number of images waiting in the queues), the average queuing latency, the average time to live status of images in the queues, and dwell time ratios among the queues. The Business Manager tracks these statistics and adjusts variable parameters of operation of the system 10 (e.g., adds more servers, adds more bandwidth, adds more memory, and so forth) to keep the statistics within desired values.

Once the step 324 determines that 5 minutes have passed, a determination is made in a step 328 whether 10 minutes have passed since the start of the timer of the step 322. If 10 minutes have not passed, the method 320 proceeds to a step 330 of tabulating commercial wireless network usage by the system 10. In the step 330, the Business Manager periodically monitors usage of commercial wireless networks by the system 10 in efforts to optimize for minimal costs of such usage. For example, the Business Manager may in certain conditions change operating mode or service level or shut down a particular one of the camera elements 12 if costs exceed preprogrammed thresholds. The Business Manager also alerts administrators if costs are excessive for any particular ones of the camera elements 12 or in the aggregate. The information is useable by administrators to determine where and whether to replace a third-party cell site 62 with a dedicated cell site 60, or to take other actions. Once 10 minutes have passed, the method 320 continues through command server steps.

In a step 332 of the command server steps, a determination is made whether a queuing request is then received by the Business Manager from the Web Server Communications Manager. If the queing request is then received, the queing request is processed in a step 334 and the method 320 then returns in a step 336 to the step 322. If the queing request is not then received, the method 320 proceeds to a step 338 of determining whether a new one of the computers 22 is to be registered to receive images from the system 10. If a new one of the computers 22 is then to be so registered, the new one of the computers 22 is registered in a step 340. After the step 340, the method 320 returns to the step 322 in the step 336.

A step 342 of determining whether a change of service level is to be effected follows the step 338 if a new one of the computers 22 is not then registered. If a change service level request is received at the step 342, a step 344 of changing the service level follows. After the step 344, the method 320 returns to the step 322 in the step 336. If no change service level request is received at the step 342, a step 346 determines whether a new broadcast message is then received from one of the camera elements 12. If a new broadcast message is received at the step 346, the broadcast message is processed in a step 348. The method 320 thereafter returns to the step 322 in the step 336.

A step 350 detects whether a message is then received to fill an active camera element list maintained at the web site of the World Wide Web server 18. If the message is then received, a step 352 sends the active camera element list to the web site and the method 320 returns to the step 322 in the step 336. If the message is not received, a step 354 detects whether a report system statistics message has been received. If the message is received at the step 354, the system statistics are reported to the system administrator in a step 356. Following the step 356 or if the report system statistics message is not then received, the method 320 returns to the step 322 in the step 336.

The foregoing server command steps are exemplary of those performed by the Business Manager. Additional or alternative steps may be performed, as those skilled in the art will understand and appreciate. Of the foregoing server command steps, three critical tasks for operation of the system 10 are the steps 338 and 340 of detecting requests for and registering new computers 22, the steps 346 and 348 of detecting receipt of broadcasts from the camera elements 12 and processing those broadcasts, and the steps 342 and 344 of detecting change of service level requests and responding thereto. The following describes each of the tasks in greater detail.

Figure 17:
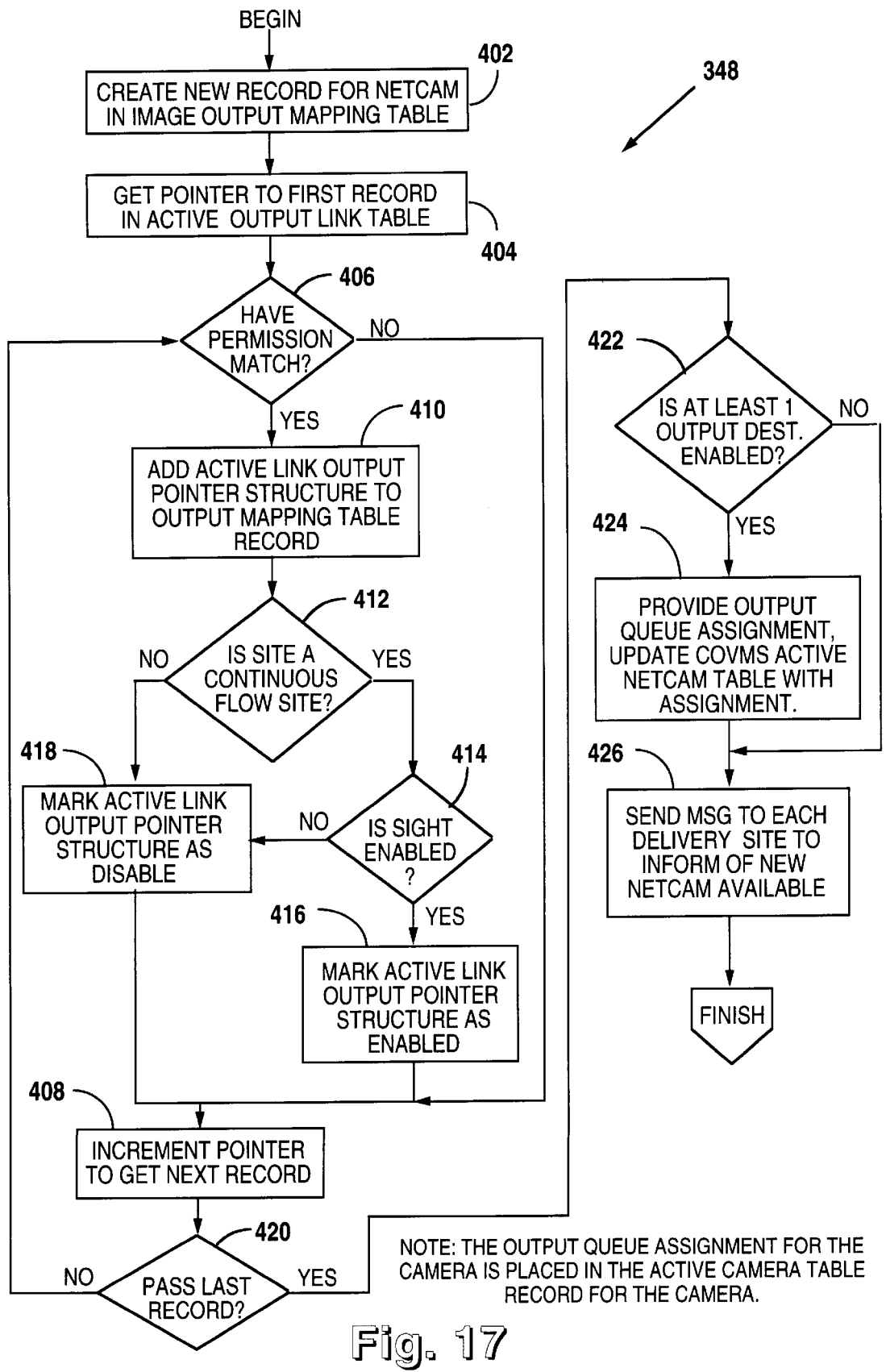
FIG. 17 is a method of operations of the Business Manager when a CommLink Manager of the central office video management system of the system of FIG. 1 indicates that a new camera element is available to the system of FIG. 1, according to embodiments of the invention.

Referring to FIG. 17, when the CommLink Manager announces that a new one of the camera elements 12 is available to the system 10, the Business Manager responds by the method 348 of assigning the image data to an output queue and insuring that the images are sent to the right ones of the computers 22. In a step 402, the Business Manager creates a new record for a new one of the camera elements 12 in the Image Output Mapping Table. The Business Manager then gets a pointer to the first record in the Active Output Link Table in a step 404.

In a step 406, a determination is made whether there is any match of the camera element 12 with the Active Output Link Table such that the camera element 12 has permission on the system 10. If the camera element 12 does not have permission on the system 10, then the method 400 proceeds to a step 408 of incrementing the pointer to get the next record of the Active Output Link Table. If the camera element 12 does have permission on the system 10, the method 400 proceeds to a step 410 in which an active link output pointer structure is added to an output mapping table record. In a step 412, a determination is made whether the site of the camera element 12 is a continuous flow site. If it is a continuous flow site, a determination is made in a step 414 whether the site is enabled. If the site is enabled, then the active link output pointer structure is marked as enabled in a step 416. The method 400 then proceeds to the step 408 of incrementing the pointer to get the next record.

If the determination in the step 412 is that the site is not a continuous flow site, the method 400 proceeds to a step 418 of marking the active link output pointer structure as disabled. Thereafter, the pointer is incremented in the step 408 to get the next record. In a step 420, a query is made whether the last record has been passed. If not, the method 400 returns to the step 406 of determining whether there is any match such that the camera element 12 is permitted.

If in the step 420 the last record has been considered, the method 400 proceeds to a step 422 of determining whether at least one output destination, that is, at least one of the computers 22, has been enabled. If there is at least one output destination that has been enabled at the step 422, a step 424 provides an output queue assignment, and updates the COVMS 16 tables of the camera elements 12 that are active with the particular output queue assignment. If there is not at least one output destination that is enabled at the step 422 or if the step 424 is completed, a step 426 sends a message to each delivery site, i.e., each of the computers 22, to inform them of the availability of the new one of the camera elements 12.

Figure 18:
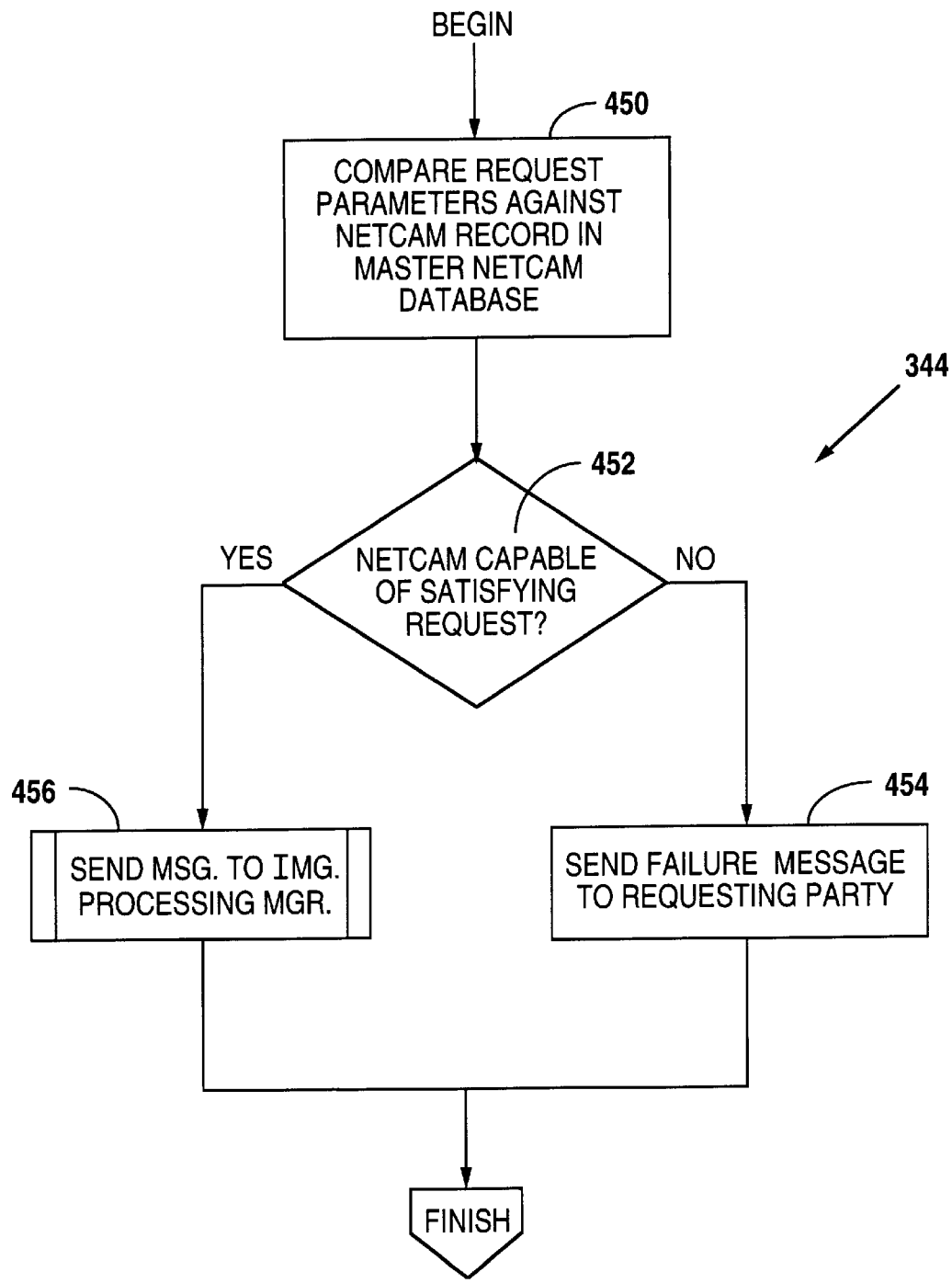
FIG. 18 is a method of operations of the Business Manager when a service level change is requested from a user computer of the system of FIG. 1, according to embodiments of the invention.

Referring to FIG. 18, when it is determined in the step 342 that a service level change is requested from one of the computers 22 or the web site, the Business Manager proceeds with the method 344. The method 344, in effect, checks the request against the capabilities of the relevant one of the camera elements 12 as given in the Master Camera Element Database. If the check is not satisfactory, a failure message is returned to the computer 22 that made the request. If the check is satisfactory, the Business Manager passes the request on to the Image Processing Manager for processing. At a later point, the Image Processing Manager returns a message to the Business Manager advising it of success or failure of the prior requests. This message is relayed to the computer 22.

In a step 450 of the method 344, a comparison is made of the request parameters against the record for the camera element 12 in the Master Camera Element Database. A step 452 follows in which a determination is made whether the camera element 12 is capable of satisfying the request. If the camera element 12 is not so capable, a step 454 sends a failure message to the computer 22 making the request. If the camera element 12 is so capable, a step 456 sends a message to the Image Processing Manager. The Image Processing Manager then takes over as later discussed in Section (3), below.

Figure 19:
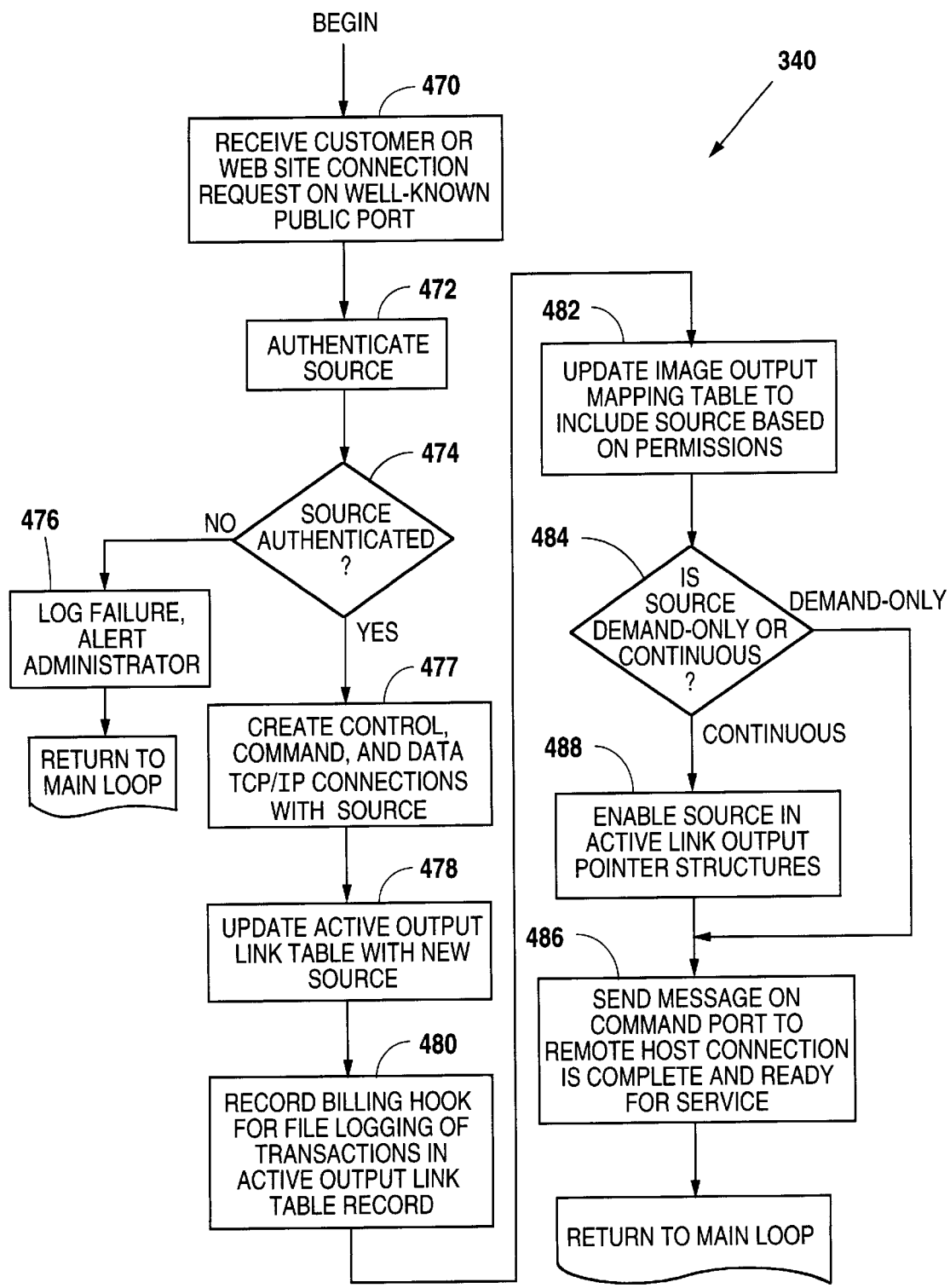
FIG. 19 is a method of registering a new customer or display web-site for the system of FIG. 1, according to embodiments of the invention.

Referring to FIG. 19, the method 340 of registering a new customer, i.e., a new one of the computers 22 that is allowed access to images of the camera elements 12, proceeds with a step 470 of receiving a customer or web site connection request on a public port. In a step 472, the source of the request is authenticated. A step 474 follows in which a determination is made whether the source is, in fact, authenticated. If there is not authentication in the step 474, a log failure and alert to the administrator occurs in a step 476. In a step 478, the method 340 returns to the method 320 (shown in FIG. 16).

If there is authentication in the step 474, control, command, and data TCP/IP connections with the source are created in a step 476. In a step 478, an update is made of the Active Output Link Table with the new source. A step 480 initiates logging of transactions by the new source in a record of the Active Output Link Table. A step 482 updates the image output mapping table to include the new source.

In a step 484, a determination is made whether the source is demand-only or continuous. If it is determined that the source is demand-only, the method 340 proceeds to a step 486 of sending a message on the command port to the remote host that the connection is complete and ready for service. If in the step 484 it is determined, instead, that the source is continuous, a step 488 enables the source in the active link output pointer structures and the step 486 follows. After the step 486, the method 340 returns to the method 320.

iv) Other operations

In addition to the operations just described, the Business Manager also monitors overall performance of the system 10 and performs adjustments to operations of the system 10 to make it run more efficiently. The Business Manager further maintains the central data base that contains specifics of the system 10. Modifications to the system 10 are notified by the process responsible to the Business Manager to make the update.

(2) The CommLink Manager

The CommLink Manager handles all communications between the camera elements 12 and the COVMS 16. In general, each communication between any one of the camera elements 12 and the COVMS 16 is assigned an identification (ID). The ID is used by all the other processes within the system 10. The CommLink Manager maps each ID into an IP address before processing communication requests related to the particular communication. In processing communication requests, the CommLink Manager receives incoming communication requests from the camera elements 12, authenticates the requests, and then assigns necessary resources of the system 10 to process the image data from the camera elements 12.

Figure 20:
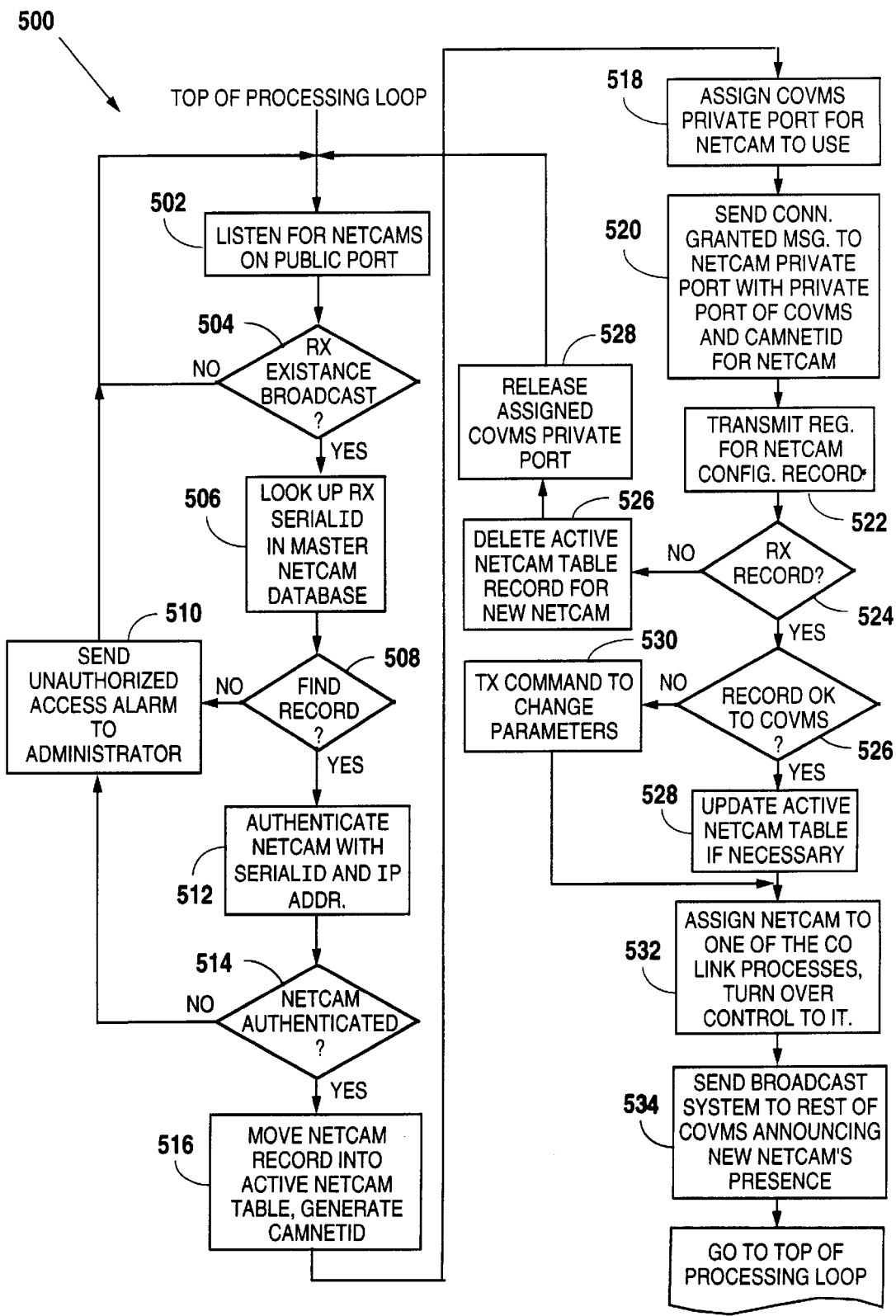
FIG. 20 is a method of operation of a CommLink Manager of the system of FIG. 1, according to embodiments of the invention.

Referring to FIG. 20, a process 500 of the CommLink Manager begins with the COVMS 16 listening for the camera elements 12 sending existent broadcasts in a step 502. In a step 504, the COVMS 16 tests whether an incoming broadcast is detected. If no such broadcast is detected, the process 500 returns to the step 502. If an incoming broadcast is detected, that broadcast includes the serial ID for the camera 12. The COVMS 16, in a step 506, looks up the serial ID assigned to the camera element 12 making the broadcast in a database of the COVMS 16 containing the serial ID's for all of the camera elements 12 then operating and obtains an IP address for the particular camera element 12. In a step 508, it is determined whether the particular ID and IP address match, and whether the related database record is found. If not found, the process 500 continues to a step 510 of the COVMS 16 sending an unauthorized access alarm to a system administrator, for example, via the administrative computer of the system 16. The process 500 then returns to the step 502.

If the ID and database record are found in the step 508, the camera element 12 is authenticated according to the ID and is assigned an IP address in a step 512. A determination is made in a step 514 whether the camera element 12 is authenticated. If not, the process continues to the step 510 with an unauthorized access alarm and then returns to step 502. If the camera element 12 is authenticated, however, the database record for the camera element 12 is moved, in a step 516, into an active table from which is generated a specific identifier for the camera element 12. In a step 518, a particular port of the COVMS 16 is assigned for use by the camera element 12 in communications with the COVMS 16.

In a step 520, the COVMS 16 then sends a connection granted message to the camera element 12 via the particular port and the specific identifier. The COVMS 16, in a step 522, then sends a transmit request to the camera element 12 for the particular configuration record applicable to the camera element 12. A determination is made in a step 524 whether the record is received by the COVMS 16 from the camera element 12. If not received, then the database record for the camera element 12 is deleted from the active table in a step 526. The particular port of the COVMS 16 assigned to the camera element 12 is then released in a step 528, and the process 500 returns to the step 502.

If in the step 524 it is determined that the record is received, the COVMS 16 in a step 526 assesses whether the record is suitable. If suitable, an update of the active table is made if necessary, in a step 528. If the record is not suitable, a command is transmitted to change parameters in a step 530. After the step 528 or the step 530, as the case may be, the camera element is linked to the COVMS 16 in a step 532. In a step 534, the COVMS 16 notifies each of its components that the camera element 12 is linked with the system 10. A link message is sent to all components of the system. When the Image Processing Manager receives the link message, it looks for the link and sets up a queue for input. When the Business Manager receives the link message, it sets up a queue for output. The process 500 then returns to the step 502.

(3) The Image Processing Manager

The Image Processing Manager handles the image processing functions of the COVMS 16. The Image Processing Manager has sub-processes that handle the respective image streams from each camera element 12. During set-up of the camera element 12, the CommLink Manager directs the communication link to dump received encoded image data to the designated input queue. The CommLink Manager then sends a message to the Image Processing Manager that a particular sub-process must be set-up by the Image Processing Manager to retrieve the data from the queue and process it. The Image Processing Manager then sends a message to the Business Manager to set-up the separate, particular receiving output queue for the image stream.

Figure 21:
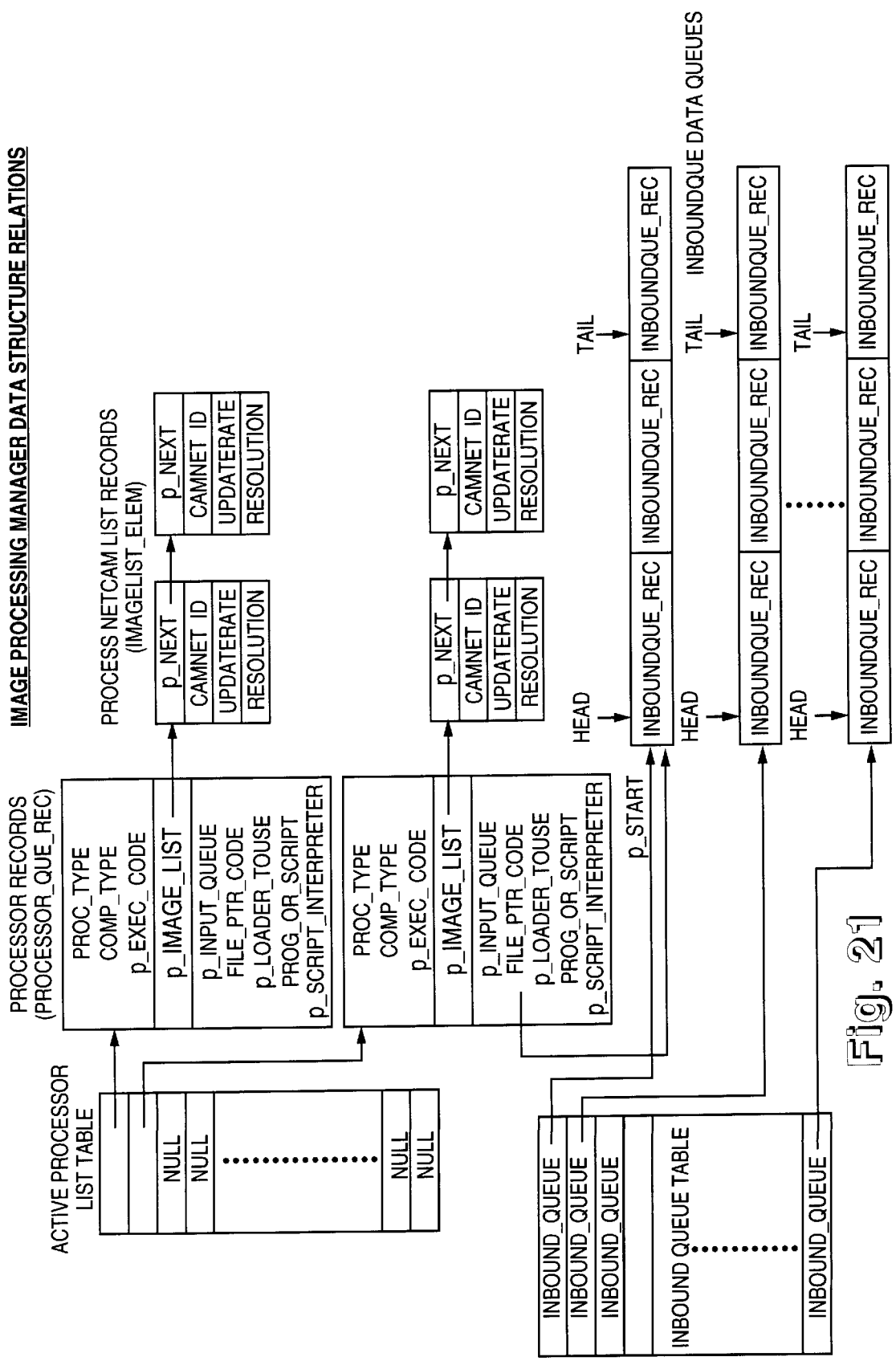
FIG. 21 is an illustration of primary data structures employed by an Image Processing Manager of the system of FIG. 1, according to embodiments of the invention.

Referring to FIG. 21, the Image Processing Manager uses two primary data structures, and several secondary data structures to keep track of the sub-processes and input queues that are active in the system 10. The relationship of the various structures are given in FIG. 21. The Image Processing Manager uses an Active Processor List Table to maintain a list of active sub-processes running in the system 10. Each active sub-process has an entry in the table that points to a processor record (processor_que_rec), where non-active list entries contain the null pointer value. Each sub-process record contains information about the type of sub-process, a pointer to an input queue that feeds the process, a list of the camera elements 12 that contribute images to the queue, and other information necessary to load and run the process. The pointer to the input queue points to an input queue in an Inbound Queue Table. The list of the camera elements 12 that feed the queue is a linked list of process camera element list records (imagelist_elem). Each record contains the ID, update rate and resolution of the camera elements 12 that are feeding the processors input queue. Typically, only one of the camera elements 12 feeds each input queue, however, it is not uncommon under certain circumstances for more than one of the camera elements 12 to feed a single image queue.

The Inbound Queue Table keeps track of the Image Processing Manager's available input queue resources. Each COVMS 16 is limited to MAXINPUTQUEUE input queue resources and these are preallocated at system 10 startup. Each entry in the Inbound Queue Table holds an INBOUND_QUEUE record that completely describes an inbound image queue. The actual queue space is elsewhere in memory and pointed to by the p_sort member of the INBOUND_QUEUE record. Each time a new Image Processing Manager sub-process is launched it is assigned an input queue from the pool of free queues in the Inbound Queue Table. When all the queues are used up, the system 10 is saturated, no more Image Processing Manager sub-processes may be started, and it is time to allocate any new processing to an alternate COVMS 16.

Figure 22:
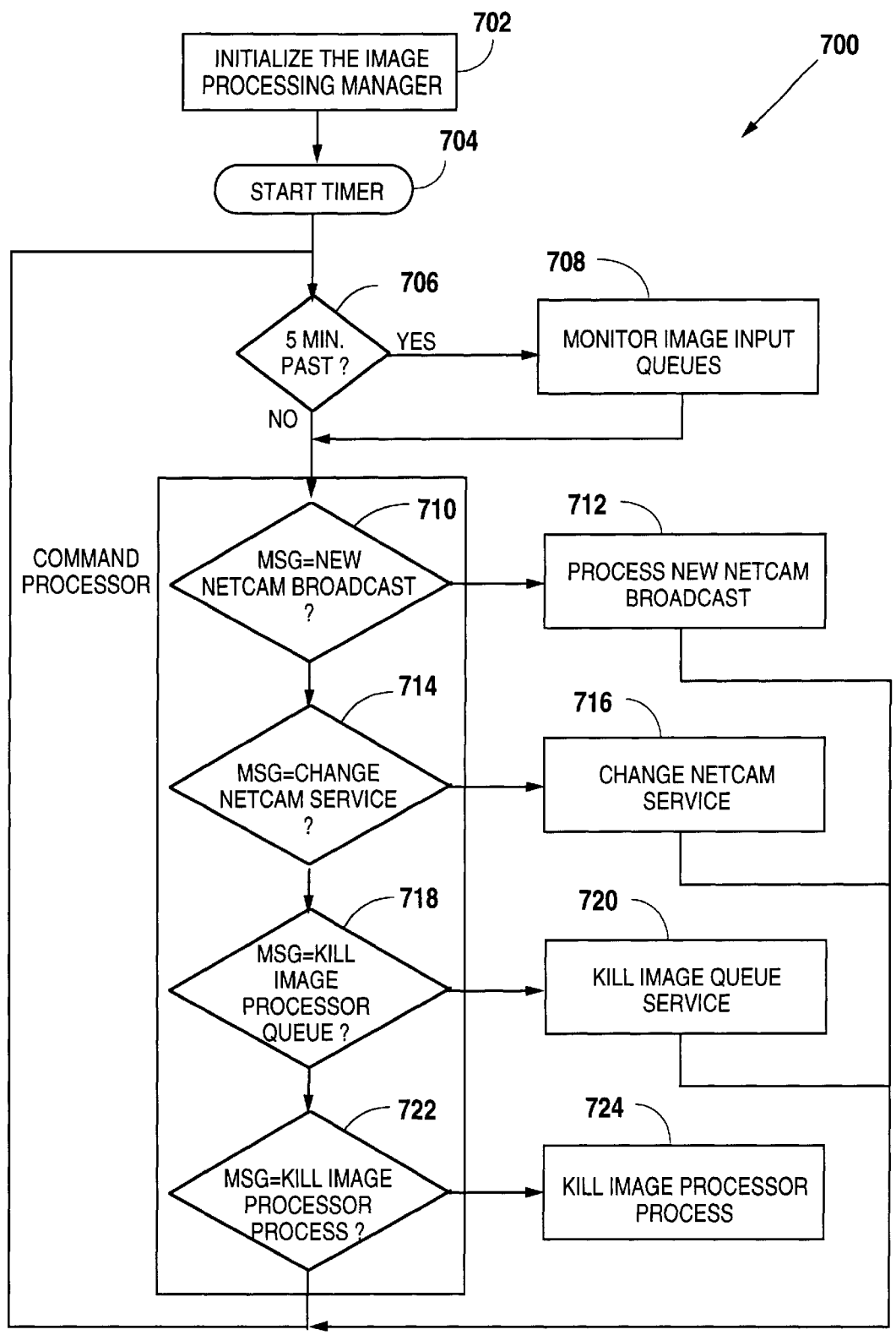
FIG. 22 is a method of operation of the Image Processing Manager of the system of FIG. 1, according to embodiments of the invention.

Referring to FIG. 22, a method 700 of the Image Processing Manager acts essentially as a command or message processor. In effect, the method 700 repeats an infinite processing loop in which the method 700 carries out basic message processing functions. The Image Processing Manager has essentially two tasks: to monitor and adjust accordingly any inbound image queues and to respond to command messages. There are four primary commands to which the Image Processing Manager responds, as follows: new camera element broadcast messages, change camera element service messages, kill image queue messages, and kill image processor messages. In responding to these commands, the Image Processing Manager manages the image processing sub-processes and the image input queues of the system 10. Each of these four primary commands either sets up or tears down a queue and/or an image processor. Thus, the Image Processing Manager controls allocation of inbound image queues and image processor sub-processes. Additionally, the Image Processing Manager binds each of the camera elements 12 to respective inbound image queues and image processor sub-processes.

The method 700 of the Image Processing Manager proceeds with a step 702 of initializing the Image Processing Manager. In a step 704, a timer is started. A query is made in a step 706 whether 5 minutes have then passed since the time was started in the step 704. If 5 minutes has passed, then the method 700 proceeds to monitor image input queues in a step 708. After the step 708 or if 5 minutes have not passed, the method 700 proceeds to command processor steps.

A step 710 of the command processor steps detects whether a new camera element 12 broadcast is received. If yes, the method 700 proceeds to process the broadcast in a step 712 and, thereafter, return to the step 706. If the broadcast is not received at the step 710, a step 714 detects whether a change in camera element service is requested. If the request is received, the camera element 12 service is changed in a step 716. The method 700 then returns to the step 706.

A step 718 detects whether a kill image processor queue request is received if no change camera element service message was received at the step 714. If the request is received at the step 718, the image queue service is killed in a step 720. The method 700 then returns to the step 706. If the request is not received at the step 718, a step 722 detects whether a kill image processor process is requested. If the kill image processor process is requested, the image processor process is killed in a step 724.

Figure 23:
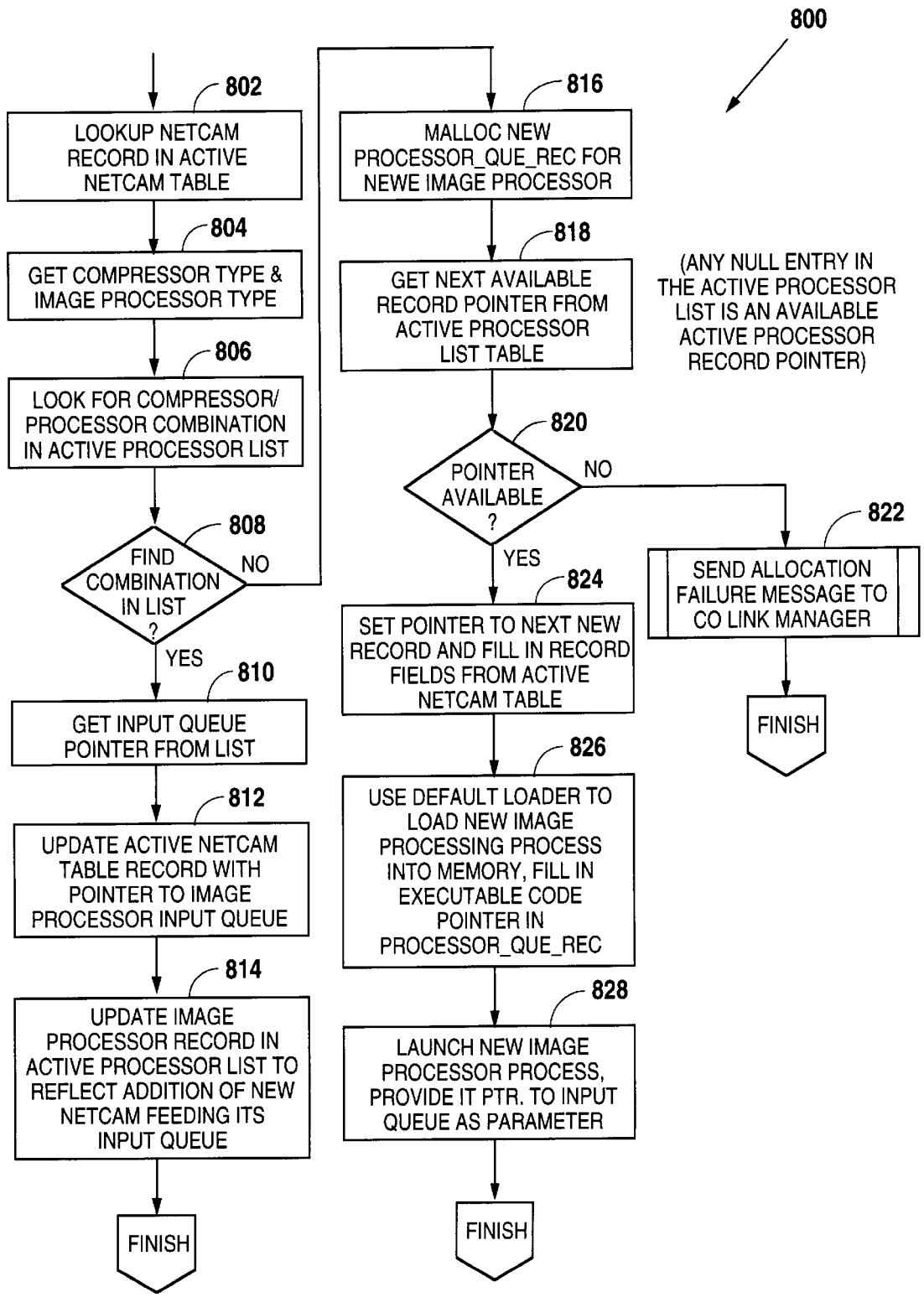
FIG. 23 is a method of operation of a sub-process of adding new camera elements of the Image Processing Manager of the system of FIG. 1, according to embodiments of the invention.

Referring to FIG. 23, a sub-process 800 of the Image Processing Manager processes new camera elements 12 as they are added to the system 10. When the CommLink Manager adds a new one of the camera elements 12 to the system 10, the CommLink Manager creates a record for the camera element 12 in the Active Camera Element Table. One field of the record is the linked list of pointer to input queues to which the link process assigned to the camera element 12 is to place the inbound image data. Initially, when the record is created, the field is null, which specifies the null queue.

The null queue is a special entity used by the link processes to which inbound image data is sent to be destroyed. If a link process does not have an inbound queue assignment to which to send incoming image data, the link process sends the image data to the null queue to be destroyed. Once an image is sent to the null queue, the image cannot be recovered.

The CommLink Manager sends a system broadcast message to all processes in the COVMS 16 towards the end of the process whereby it brings the new camera element 12 on-line. Image data that comes in from the camera element 12 after the CommLink Manager has set up the new camera element 12, but before the Image Processing Manager has setup an image processor and input queue, goes into the null queue and is destroyed.

The Image Processing Manager responds to the new broadcast message from the CommLink Manager by initiating the sub-process method 800. In a step 802, the Image Processing Manager looks up the record in the Active Camera Element Table for the new camera element 12. The processing and compression needs applicable to the new camera element 12 are retrieved in a step 804. In a step 806, the Image Processing Manager searches a table of all existing image processing sub-processes to determine if the particular compressor/processor combination is already present to meet the applicable needs.

In a step 808, a determination is made whether the combination of the particular compressor/processor is found in the list. If found, the method 800 proceeds to a step 810 of getting the pointer to the image processor input queue for the new camera element 12 from the list. In a step 812, the Active Camera Element Table record for the camera element 12 is updated with the pointer. A step 814 updates the image processor record in the active processor list to reflect the addition of the new camera element 12 feeding the applicable input queue.

If the compressor/processor combination was not found in the list in the step 808, the method 800 proceeds to make a compressor/processor combination sub-process for the new camera element 12. In a step 816, the Image Processing Manager creates a new processor_que_rec to hold information about the new sub-process. The required image processing task for the new camera element 12 is retrieved from the Active Camera Element Table entry for the camera element 12. The entry indicates to the Image Processing Manager the location of the application and how to load its executable code. In a step 818, the Image Processing Manager then links the newly created record into the Active Process List. A determination is made in a step 820 whether a record pointer is available from the Active Process List. If the record pointer is not available, a step 822 sends an allocation failure message to the CommLink Manager. If the record pointer is available, a step 824 sets the pointer to the next new record and fills the new record from information in the Active Camera Element Table, including by assigning an inbound image queue from the available pool in the Inbound Queue Table, placing the new camera element 12 in a imagelist_elem structure, and attaching the structure to the processor record's image list (pointed to by the p_image_list member). A step 826 uses a default loader to load a new image processing sub-process into memory and to fill in an executable code pointer in processor_que_rec. In a step 828, the method 800 starts the new image processor sub-process and provides it the pointer to the input queue as a parameter.

Figure 24:
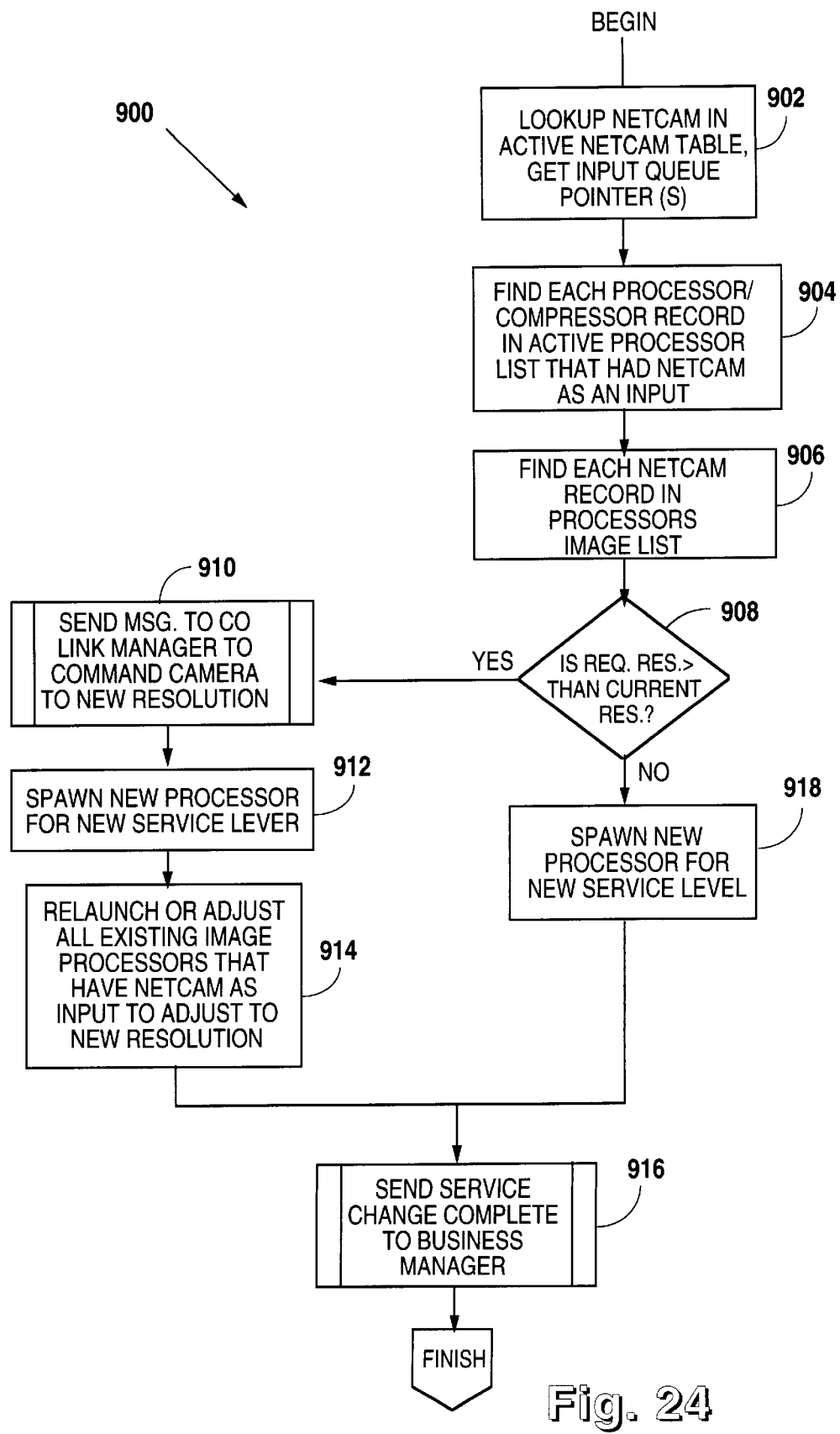
FIG. 24 is a method of operation of a sub-process of changing a service level for the Image Processing Manager of the system of FIG. 1, according to embodiments of the invention.

Referring to FIG. 24, a sub-process method 900 of the Image Processing Manager occurs when a change request is made for a change in camera element 12 service, for example, as a new computer 22 connects to the COVMS 16 or as one of the computers 22 subscribing to a higher service level logs into the web site. When this occurs, the Business Manager sends the change request directly to the image Processing Manager for processing. The Image Processing Manager makes decisions on how to proceed with the request and whether or not to allow the change.

In a step 902, a look-up of the relevant one of the camera elements 12 is performed in the Active Camera Element Table. Based on the look-up, input queue pointer(s) for the camera element 12 are retrieved. In a step 904, each processor/compressor record for the camera element 12 in the active processor list is found. Each record for the camera element 12 is then found in a step 906 in the processors image list.

In a step 908, a determination is made whether the requested service is greater than the current service levels of the system 10 for the camera element 12. If the requested service is greater, the method 900 proceeds to send the message to the CommLink Manager to command the camera element 12 to a new image resolution, update rate, and possibly operating mode. In a step 912, a new processor is put into service for the new service level and the input queue for the new service level is added substantially in the manner that it is done for adding a new camera element 12. In a step 914, other image processors which may be running for the same camera element 12 at different service level are adjusted or restarted to achieve a new input resolution and update interval. After the steps 914 or 918, the Image Processing Manager in a step 916 sends a service change complete message to the Business Manager.

In the instance of the two other commands sent to the Image Processing Manager by the CommLink Manager, i.e., that is, the kill image processor queue and the kill image processor process messages, the commands are sent by the CommLink Manager on termination of a camera element 12 session. When the connection with the camera element 12 is broken, the link process that manages the session is released and sends a termination message to the CommLink Manager. The CommLink Manager in turn sends kill messages to the Image Processing Manager to release all resources dedicated to the camera element 12 that has been terminated and then destroys the camera element 12 record in the Active Camera Element Table. The Image Processing Manager's response to these messages is simply to release the queues and/or terminate the sub-processes.

(4) The Web Server Communications Manager

The Web Server Communications Manager is a process of the COVMS 16 responsible for taking post-processed images and insuring their timely delivery to the web site or end-user at the computer 22. The Web Server Communications Manager is provided processed images by the output of the image processor applications of the Image Processing Manager through several queues shared by the Web Server Communications Manager and the Image Processing Manager. Queues are established for each different update interval currently being subscribed and active at any instant. Additional queues are establishable within each update rate if there are substantial time_to_live differences among images coming from different ones of the camera elements 12.

Every image processed by the COVMS 16 has a time_to_live statistic associated with it. The time_to_live statistic is equal to the difference between the minimum update interval currently demanding the image, and the time that has elapsed between acquisition and the end of the COVMS 16 processing. In other words, the time_to_live statistic is the amount of time remaining after the COVMS 16 processing is complete before the images update interval expires.

Figure 25:
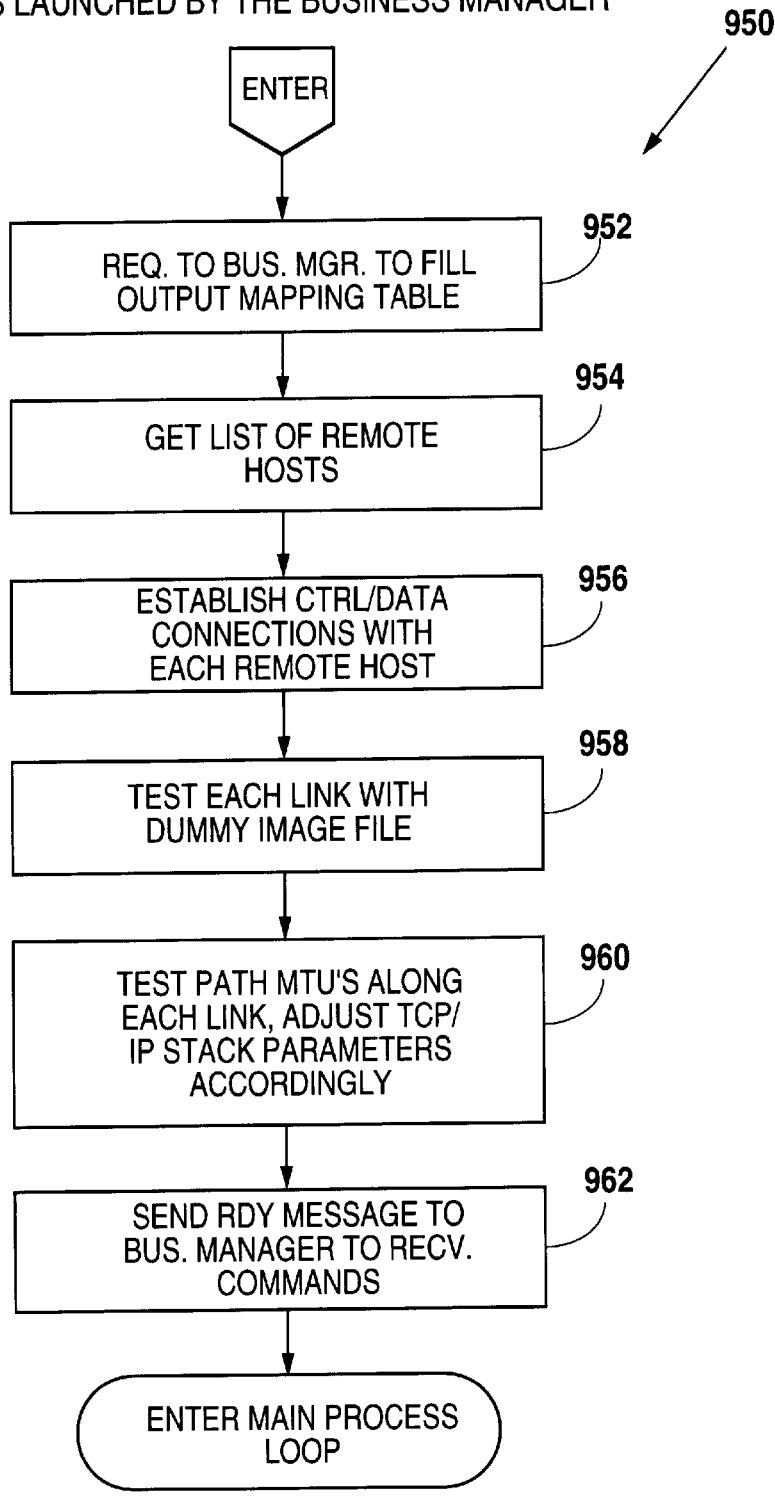
FIG. 25 is a method of initialization of a Web Server Communications Manager of the system of FIG. 1, according to embodiments of the invention.

Referring to FIG. 25, the Web Server Communications Manager must perform six distinct tasks to initialize itself for normal steady state operations:

1) Send request to Business Manager to create an output mapping table
2) Send request to Business Manager to create table of queues to service
3) Establish control and data connections with each remote host
4) Test each communications link with dummy image file
5) Determine and record path MTU for each link
6) Send ready message to Business Manager A method 950 of initialization of the Web Server Communications Manager, shown in FIG. 25, includes a first step 952 of a request to the Business Manager for a completed image output mapping table. The image output mapping table is shown in FIG. 26 and identified by numeral 1008. The Business Manager creates the table 1008 for the Web Server Communications Manager based on the customer database and the camera element 12 database on current status of each in the system 10. In a step 954, a list of remote hosts is obtained. A step 956 establishes control and data connections with each remote host of the list. The Business Manager establishes the TCP/IP connections to the remote hosts, and is the initial point of contact for remote hosts and customer computers 22 requesting access to the COVMS 16. In a step 958, each link is tested with a dummy image file. In a step 960, the path MTU's along each link are tested and TCP/IP stack parameters are adjusted accordingly. A step 962 sends a ready message to the Business Manager to begin receiving commands.

Figure 27:
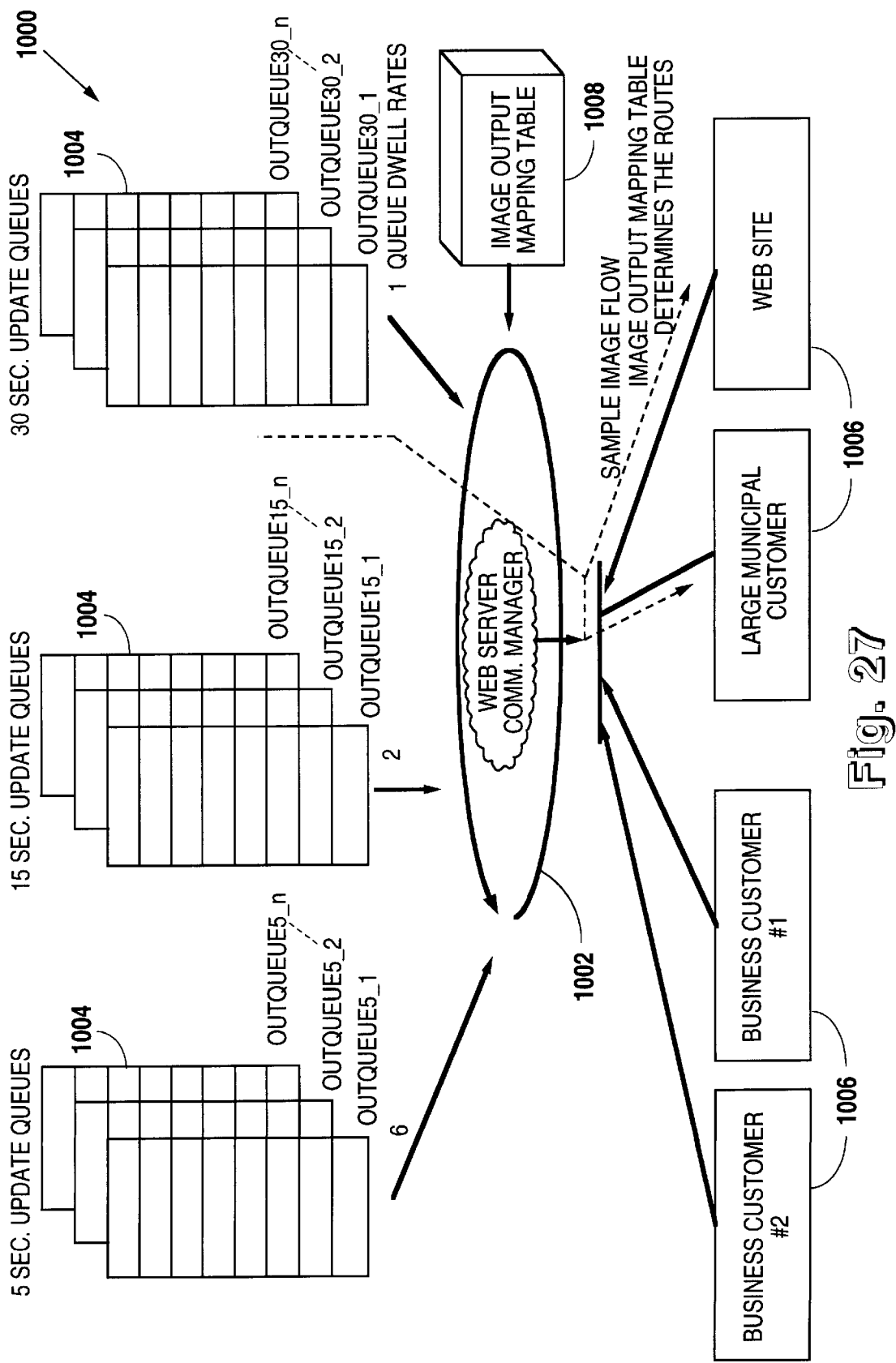
FIG. 27 is a simplified illustration of operations of the Web Server Communications Manager of the system of FIG. 1, according to embodiments of the invention.

Referring to FIGS. 25–27, in conjunction, next, the Web Server Communications Manager requests that the Business Manager create the table 1008 of queues for the Web Server Communications Manager to service. This is a table of pointers to queues 1004 to which the Web Server Communications Manager is assigned. In normal operation mode, the Web Server Communications Manager's round robin queue servicing cycle 1002 will walk a queue table servicing each queue 1004 in the table 1008.

Once the Business Manager has completed the image output mapping table 1008, the Web Server Communications Manager walks the entire table 1008 in the step 958 and insures that each TCP/IP link to the remote hosts is live and valid. If an invalid link is found, it is torn down and reestablished. A dummy image is also sent down each link in the step 958 to verify validity of the link and test the link performance characteristics. Finally, each link is tested in the step 960 for path MTU to determine the optimal TCP/IP packet size to use for each link. This process of the step 960 is repeated periodically for any links that are established along non-static, unknown routes, such as the Internet. The statistics of the link tests are used to dynamically alter the protocol stack parameters to optimize data throughput along each path.

Once these tasks are complete, the Web Server Communications Manager is ready to begin normal operations and sends a READY message to the Business Manager in the step 962 to inform the Business Manager that the Web Server Communications Manager is entering its normal operation.

Figure 28:
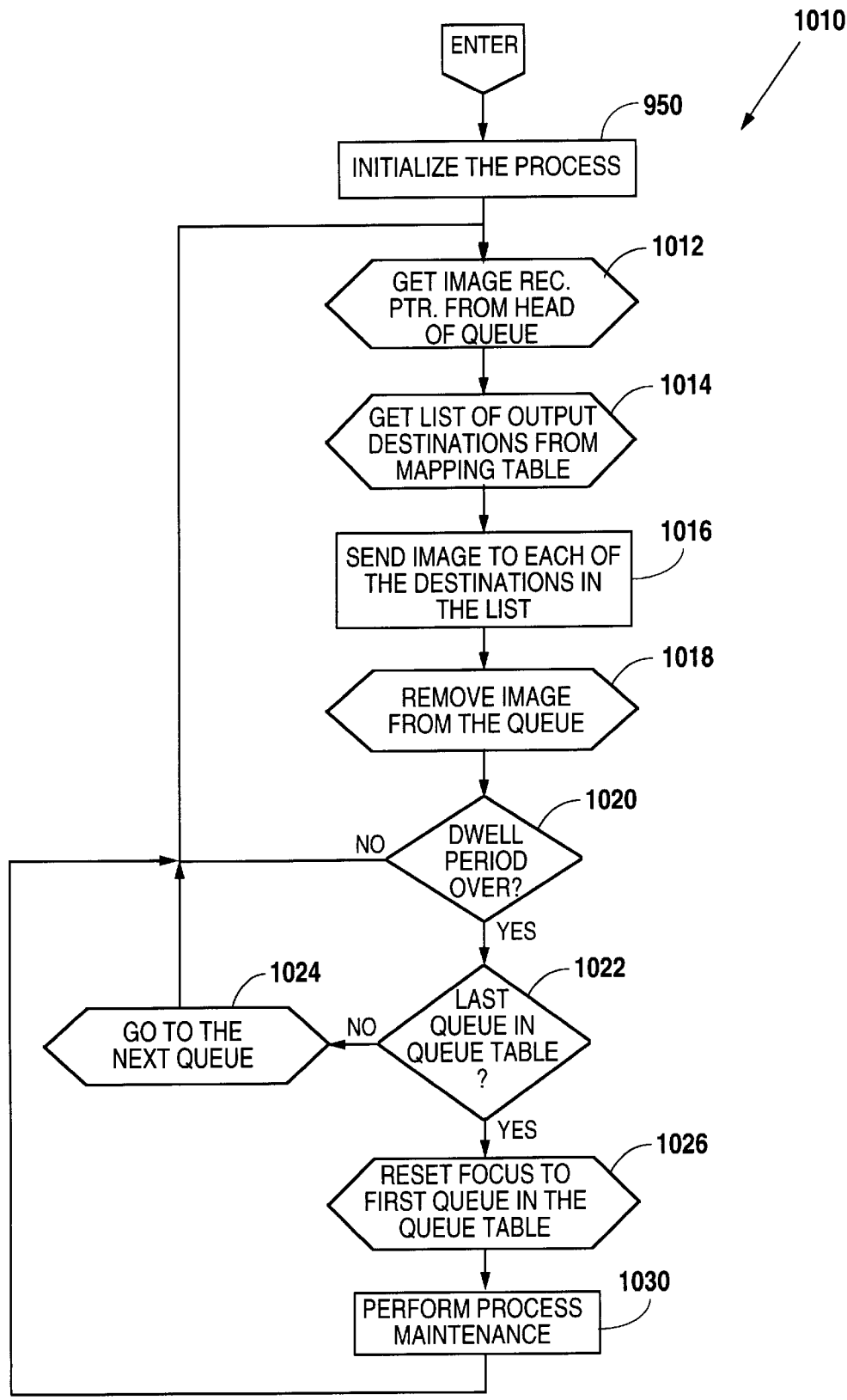
FIG. 28 is a flow diagram of a method of normal operations of the Web Server Communications Manager of the system of FIG. 1, according to embodiments of the invention.

Referring to FIGS. 27–28, in conjunction, once in the steady state of normal operations, a Web Server Communications Manager operation method 1000 implements a round robin queue service utility 1002 that retrieves images from various FIFO queues 1004 and sends them to all required destinations 1006. For each image sent, the Web Server Communications Manager consults the image output mapping table 1008 to determine to whom to send the image. Each queue 1004 has a parameter associated with it called the dwell_time which tells the Web Server Communications Manager how many images to retrieve and send from the queue 1004 in a single visit of the round robin cycle 1002. Queues 1004 that are associated with shorter update intervals typically have longer dwell times, and queues 1004 with longer update intervals typically have shorter dwell times. Each queue 1004 has two run time statistics associated with it, the queue_length and averagetime_to_live of the images in the queue 1004. At the end of each round robin cycle 1002, these statistics are collected and may be used to make adjustments to the system 10 dynamically.

Referring to FIG. 28, a method 1010 of the normal operations of the Web Server Communications Manager is begun by the initialization process of the method 950 (shown in FIG. 25). After the method 950, an image record pointer is obtained from the top of one of the queues 1004 in a step 1012. In a step 1014, a list of output destinations for the image corresponding to the image record pointer is obtained from the image output mapping table 1008. The image is then sent to each of the destinations in the list in the step 1016. In a step 1018, the image is removed from the queue 1004.

In a step 1020, a determination is made whether the applicable dwell time has expired. If not, then the method 1010 returns to the step 1012. If the dwell time has expired, a step 1022 determines whether the current queue 1004 is the last queue in the queue table. If not, a step 1024 follows in which the cycle 1002 proceeds to the next queue 1004 and the method 1010 returns to the step 1012. If the queue 1004 is the last queue in the queue table at the step 1022, the method 1010 proceeds to reset to the first queue 1004 of the cycle 1002 according to the queue table in a step 1026. Thereafter, the method 1010 proceeds to a process maintenance method 1030.

Figure 29:
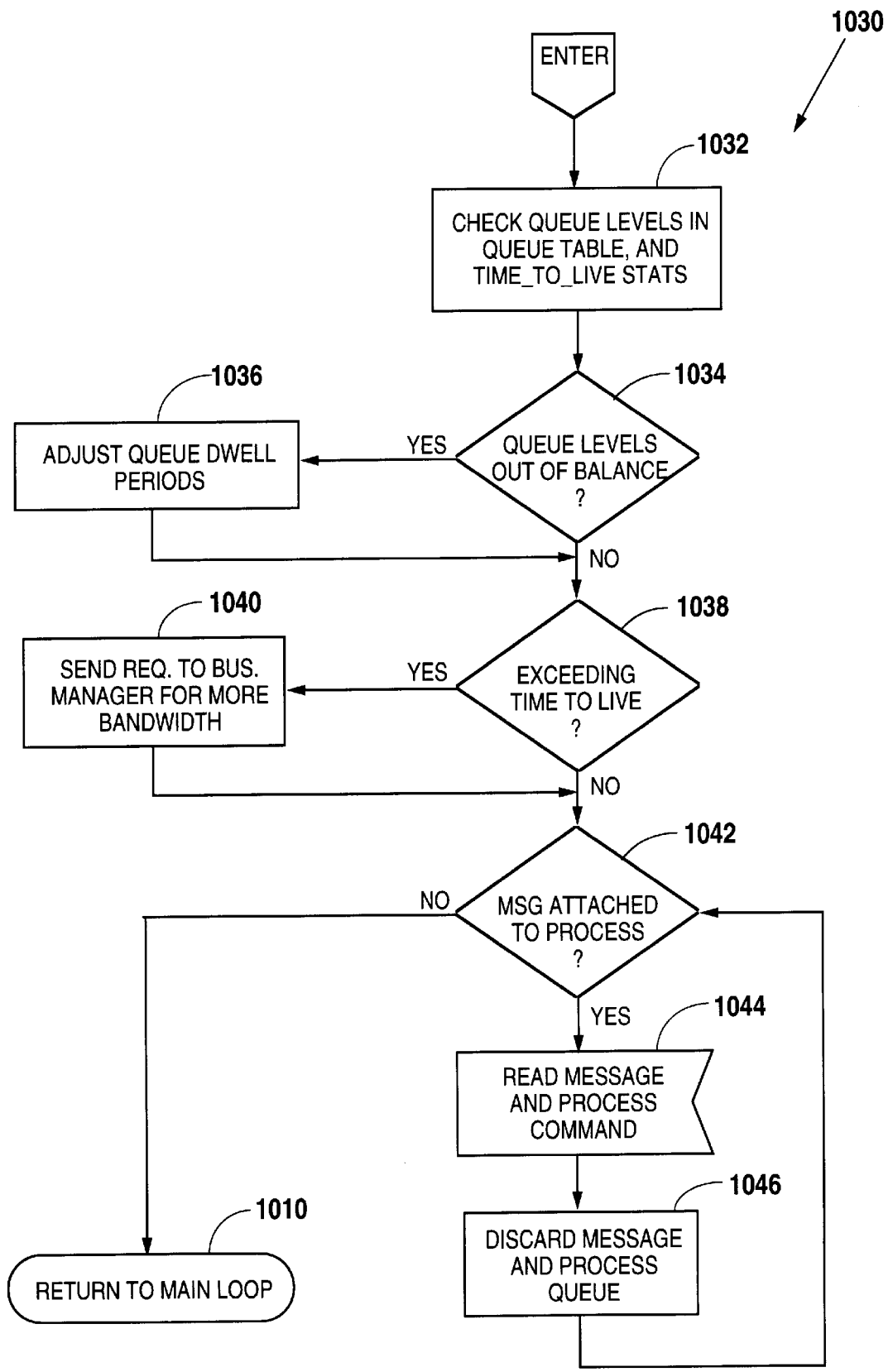
FIG. 29 is a flow diagram of a process maintenance routine of the Web Server Communications Manager of the system of FIG. 1, according to embodiments of the invention.

Referring to FIG. 29, if a queue 1004 gets too long, the process maintenance method 1030 can dynamically alter the queue's dwell time so that more images are pulled from that queue 1004 relative to the others on each update cycle 1002. If a queue 1004 length is zero, the dwell time for that queue 1004 is set to zero so that it doesn't steal cycles from other full queues 1004. Statistics for the queue 1004 with dwell time set to zero are still computed each cycle 1002, so that when an image does show up in that queue 1004, it will get sent promptly. By dynamically adjusting the queues 1004 dwell times, the Web Server Communications Manager can keep the load of images in any particular queue 1004 within a target level.

If the average time to live statistic for any queue 1004 gets too small, with respect to the amount of time required to empty the queue 1004, the process maintenance method 1030 sends a request for more bandwidth to the Business Manager. The Business Manager process may allocate more bandwidth to the Web Server Communications Manager along heavily loaded output circuits, in which case the Web Server Communications Manager is able to empty the queue 1004 more quickly since the individual file transfer times decrease in this case. However, the Business Manager may also respond by sending a message to the Business Manager of another COVMS, if any, to transfer the stream to that other COVMS.

The process maintenance method 1030 proceeds with a step 1032 of checking the queue 1004 levels in the queue table and the time_to_live statistics for the queues 1004. If the queue levels are determined to be out of balance in a step 1034, the queue dwell times are adjusted in a step 1036. Otherwise, the method 1030 proceeds to a step 1038 in which it is determined whether the time_to_live times are exceeded. If yes, the method 1030 sends a request to the Business Manager for more bandwidth in a step 1040. If the time_to_live times are not exceeded or after the step 1040, a determination is made in a step 1042 whether a message is attached to perform a particular maintenance process. If no such message is attached, the method 1030 returns to the method 1010. If a message is attached, a step 1044 reads the message and processes the command. In a step 1046, the message is discarded from the process queue and the method 1030 returns to the step 1042.

As previously mentioned, the Business Manager uses the queuing statistics along with other system-wide statistics to determine how to make trade-offs between bandwidth usage and processing power optimizing on cost. It is through this mechanism that the system 10 implements its scalability. When the Web Server Communications Manager is pushed to its limits or runs out of resources, it sounds an alarm to the Business Manager which can then add more resources in the most economical way possible to satisfy the increased computational load.

Figure 30:
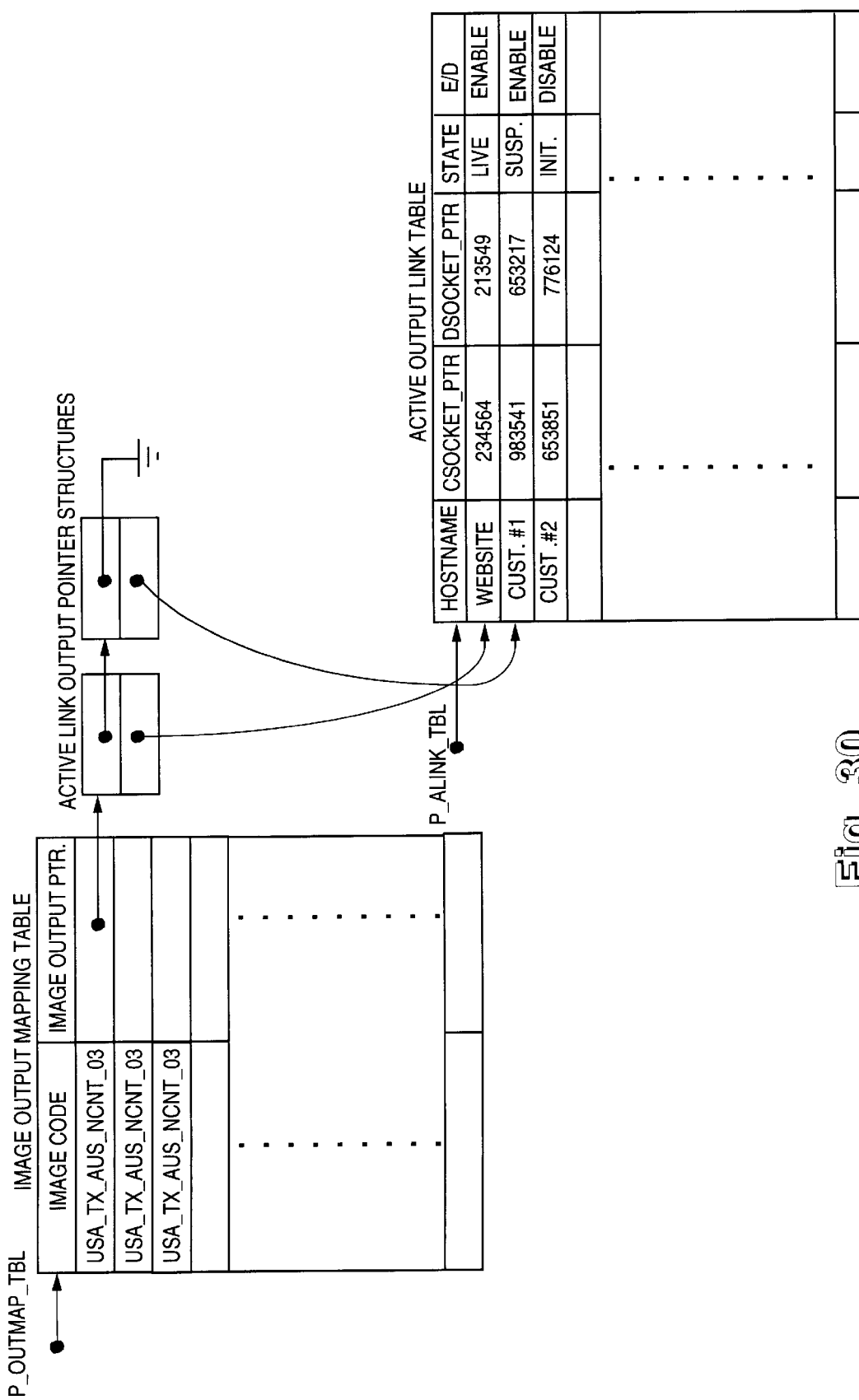
FIG. 30 is an illustration of data structures and their relationship, as used by the Web Server Communications Manager of the system of FIG. 1, according to embodiments of the invention.

Referring to FIG. 30, the Web Server Communications Manager uses four data structures, besides the image queues 1004, in carrying out its operation. It uses the image output mapping table, active output link table and active link output structures.

Active Output Link Table—This structure is a table of alink_outrec's that are defined as

```
typedef struct alink_outrec {
    char         hostname[OUTPUTHOST_NAMESIZE];
    socket       *p_csocket;
    socket       *p_dsocket;
    int          state;
    boolean      enablesw;
} ALINK_OUTREC;
```

The Business Manager creates and maintains this table that keeps all of the connection information required for existing, live TCP/IP connections to end customers and the web site. Routing for various dedicated telco links is performed at a lower level in the protocol stack so that the COVMS 16 does not need to be aware of routing issues. The Web Server Communications Manager uses references to this table to send images to their respective customers.

Image Output Mapping Table—This structure is used by the Web Server Communications Manager to determine where to send each image. The table is a linked list of structures that associate an image name code with a list of remote hosts to which to send the image. The structure is as follows:

```
typedef struct outmap_tbl_entry {
    char              image_code[CAMCODE_NAMESIZE];
    OUTMAP_ENTRY      *p_next;
    ALINK_OUTSTRUCT*p_outstruct;
{ OUTMAP_ENTRY;
```

The first field is the image code. This is synonymous with the camera element 12 name as defined in the camera element 12 name space document. The next field is a pointer to the next record in the table. Finally, the last field is a pointer to an active link structure. This is the head of a linked list that tells the Web Server Communications Manager where to send the image. The alink_outstruct is defined as:

```
typedef struct alink_outstruct {
    ALINK_OUTSTRUCT*p_next_linkrec;
    ALINK_OUTREC   *p_outrec;
} ALINK_OUTSTRUCT;
```

The second field in this record points to an entry in the Active Output Link Table from which the Web Server Communications Manager obtains the information required to send the image to that host. For each image, the Web Server Communications Manager finds the image entry in the image output mapping table and walks the linked list of outmap_entry records associated with it, sending the image to each host pointed to in the list. In this manner the Web Server Communications Manager sends each image to one or more hosts. Every image in the queues 1004 should have an entry in the image output mapping table. If one does not, it means the system 10 has become out of synch and a system synch message is sent to the maintenance and performance monitor process to correct the problem. Queue Table—This structure is a table of pointers to the queues that the Web Server Communication Manager is assigned to service. The table has declaration of:

OUTQUEUE* quetable{MAXOUTQUEUE};

It contains pointers to queues 1004 of type OUTQUEUE:

```
typedef struct outbound_queue {
    OUTBND_IMG_REC  *p_head;    /*start of the output
                                  FIFO queue */
    OUTBND_IMG_REC  *p_tail;    /*last element in the
                                  FIFO queue */
    int             size;       /*max. capacity of the
                                  queue */
    int             iud_rate;   /*image update rate
                                  of the queue */
    int             dwell_rate; /* # of images to pull
                                  in single cycle
*/
} OUTQUEUE;
```

This is the actual structure on which the Web Server Communications Manager performs its round robin cycle 1002. It begins with the first queue 1004 in the table and continues through the last, starting over at the top again. The relationship of this structure is shown in FIG. 30.

The Web Site

Figure 31:
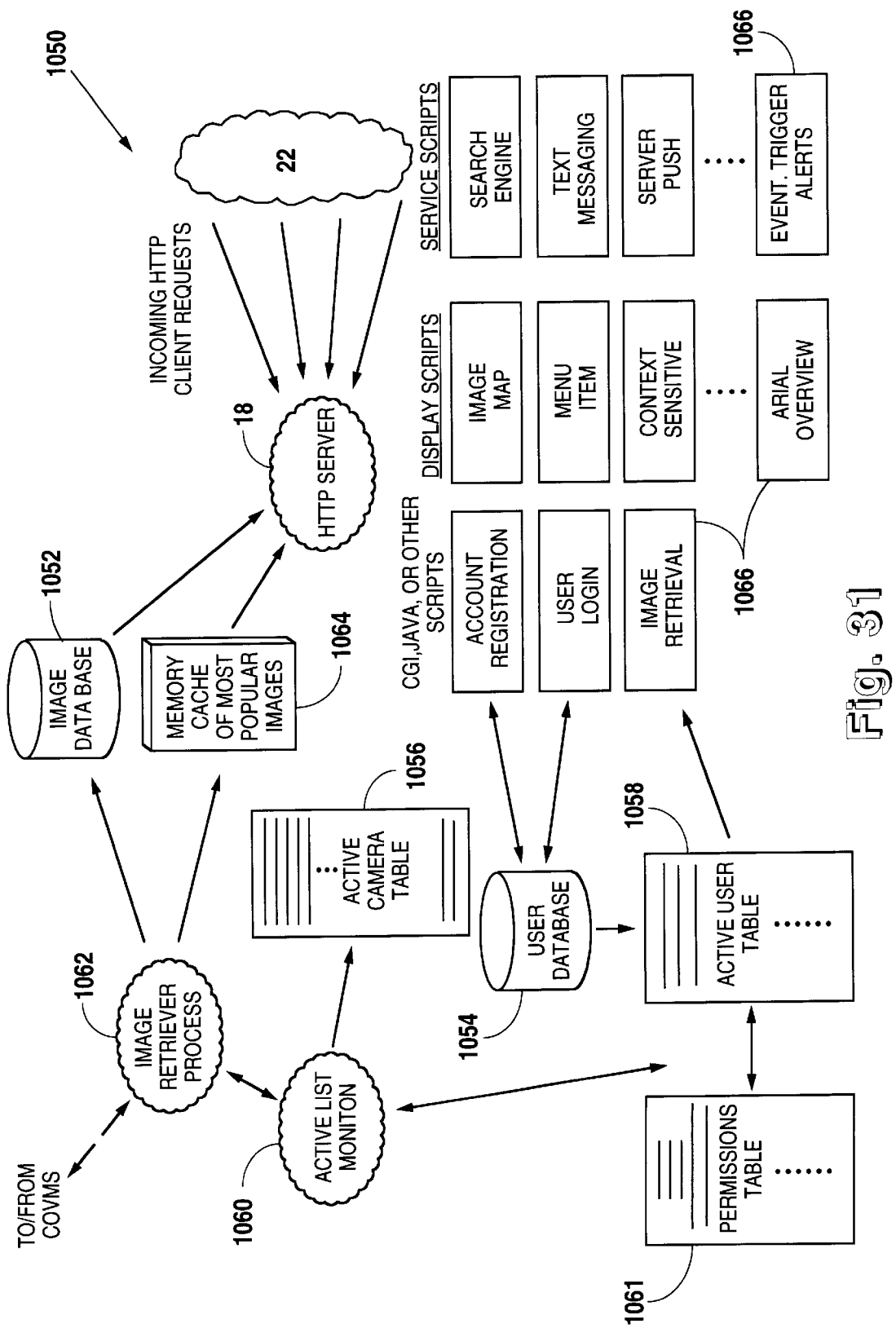
FIG. 31 is a simplified illustration of a web site of the system of FIG. 1, according to embodiments of the invention.

Referring to FIG. 31, in conjunction with FIG. 1, a block diagram of a web site 1050 of the system 10 includes three major software processes, two databases, several table structures, and a series of scripts that are invoked periodically by one of the three processes to perform various functions. The World Wide Web server 18 is standard and responds to incoming HTTP requests for information from client web browsers run on the computers 22. The World Wide Web server 18 can return a static HTML page to the requester computer 22, or it may invoke one or more scripts to dynamically generate the page to be returned to the requester computer 22.

The web site 1050 includes an image data base 1052. The image data base 1052 is the collection of live images currently being held on the World Wide Web server 18. The image data base 1052 includes a plurality of images stored on disk in a database directory tree, as well as the most commonly accessed images stored in a memory cache.

The web site 1050 also includes a user database 1054. The user database 1054 is a database of registered user computers 22. The user database 1054 contains a complete record of each user computer 22 necessary to provide particular services for which the particular user computer 22 has registered. The user database 1054 also contains information on a preferred display interface, permissions level, records of system usage, and other information for billing purposes for the particular user computers 22.

Another feature of the web site 1050 is an active camera table 1056 (distinguished from the Active Camera Element Table). The active camera table 1056 is a dynamically created and modified table kept in memory of all the camera elements 12 whose images are currently in the image data base 1052. The active camera table 1056 contains an entry for each camera element 12 currently sending images to the web site 1050. If a particular one of the camera elements 12 which has been requested by one of the computers 22 is not available, the record is a null place holder explaining why that camera element 12 is not available. The active camera table 1056 provides information necessary to allow an image retrieval script to find and return the image and associated information to the client computer 22, and implement a ping-pong buffering scheme for incoming image data.

An active user table 1058 is also part of the web site 1050. The active user table 1058 keeps track of which registered user computers 22 are currently logged into the system 10. When one of the user computers 22 logs in, the record corresponding to the computer 22 is transferred from the user database 1054 to the active user table 1058. The active user table 1058 is then used to validate requests for images after login and to verify that the user computer 22 is logged in and has access privileges for the requested information. The active user table 1058 also records user computer 22 activity and image requests and the times they occurred. This information is used for billing and by an active list monitor 1060 of the web site 1050 to implicitly log client computers 22 out.

The web site 1050 also includes a permission table 1061. The permissions table 1061 keeps track of the number of active user computers 22 logged in to the system 10 at any given permission level. A count is kept for each level, incremented when a new user computer 22 with that permission level logs in, and decremented when that user is logged, out. The permissions table 1061 is used to map access privileges to camera element 12 sites and to determine which camera element 12 sites have image data available from the web site 1050 in "demand-only" mode. If the count for a given access level reaches zero, the camera elements 12 associated with that permission level are removed from the active camera table 1056, and image data from those camera elements 12 stops flowing to the web site 1050. When the count for a given access level increases from zero to one, the camera elements 12 associated with that access level are added to the active camera table 1056, and images from the camera elements 12 begin to flow to the web site 1050 from the COVMS 16. When the web site 1050 is in continuous stream mode this mechanism is not used.

The web site 1050 also includes an image retriever process 1062. The image retriever process 1062 is responsible for accepting incoming images from the COVMS 16, placing them either in the image data base 1052 or a memory cache 1064, and updating the active camera table 1056 with the fresh image information.

The active list monitor 1060 of the web site 1050 manages coordination between active user computers 22 and active camera elements 12. The active list monitor 1060 has two primary functions. First, it is responsible for detecting additions to the active user table 1058 that require access to camera elements 12 not currently in the active camera table 1056. The active list monitor 1060 does this through the permissions table 1061, updates the active camera table 1056 to include the additional camera elements 12, and starts the image flow from the COVMS 16 for the additional camera elements 12. The second task of the active list monitor 1060 is to detect and respond to user computer 22 logouts. The active list monitor 1060 detects logouts by comparing the time since last request by the computer 22 with a threshold value, logging the user computer 22 out if the threshold is exceeded. The active list monitor 1060 then removes the user computer 22 record from the active user table 1058, decrements the permissions level count in the permissions table 1061 for the user computer 22, and, if the count is reduced to zero, removes the camera elements 12 associated with that permission level from the active camera table 1056, and stops the flow of images from the camera elements 12 so removed from the COVMS 16 to the web site 1050. The active list monitor 1060 is also the primary control process for the web site 1050 which starts all other processes at initialization.

There are a number of scripts 1066 associated with the web site 1050 that perform specific system tasks in response to inbound HTTP requests. These scripts 1066 are activated by the HTTP web server 18 in conventional manners. The scripts 1066 may be written in any number of computer languages, and may execute on the web server hot machine, or on the client machine in the case of certain JAVA-based scripts. The scripts fall into four general categories, account registration scripts, user login scripts, display scripts, and services scripts. There are many different scripts in each category, each specific to a certain type of client or service offering. The use of scripts and scripting in this fashion is the mechanism that allows new users and new services offerings to be added quickly and layered on top of the system architecture. The scripts 1066 are what implements the end-customer computer 22 display interface.

Registration scripts respond to user computer 22 requests to register for service, walking customers through the process and setting up an account for them. Login scripts facilitate the initiation of a new session for a registered user computer 22. Display scripts are responsible for presenting the customer computer 22 with his or her preferred user interface and method of retrieving images. Finally, service scripts implement other value added services, such as newsletter updates, chat capabilities, alarms for event-driven camera elements 12, search engines, and others.

Web Site Startup and System Initialization

Figure 32:
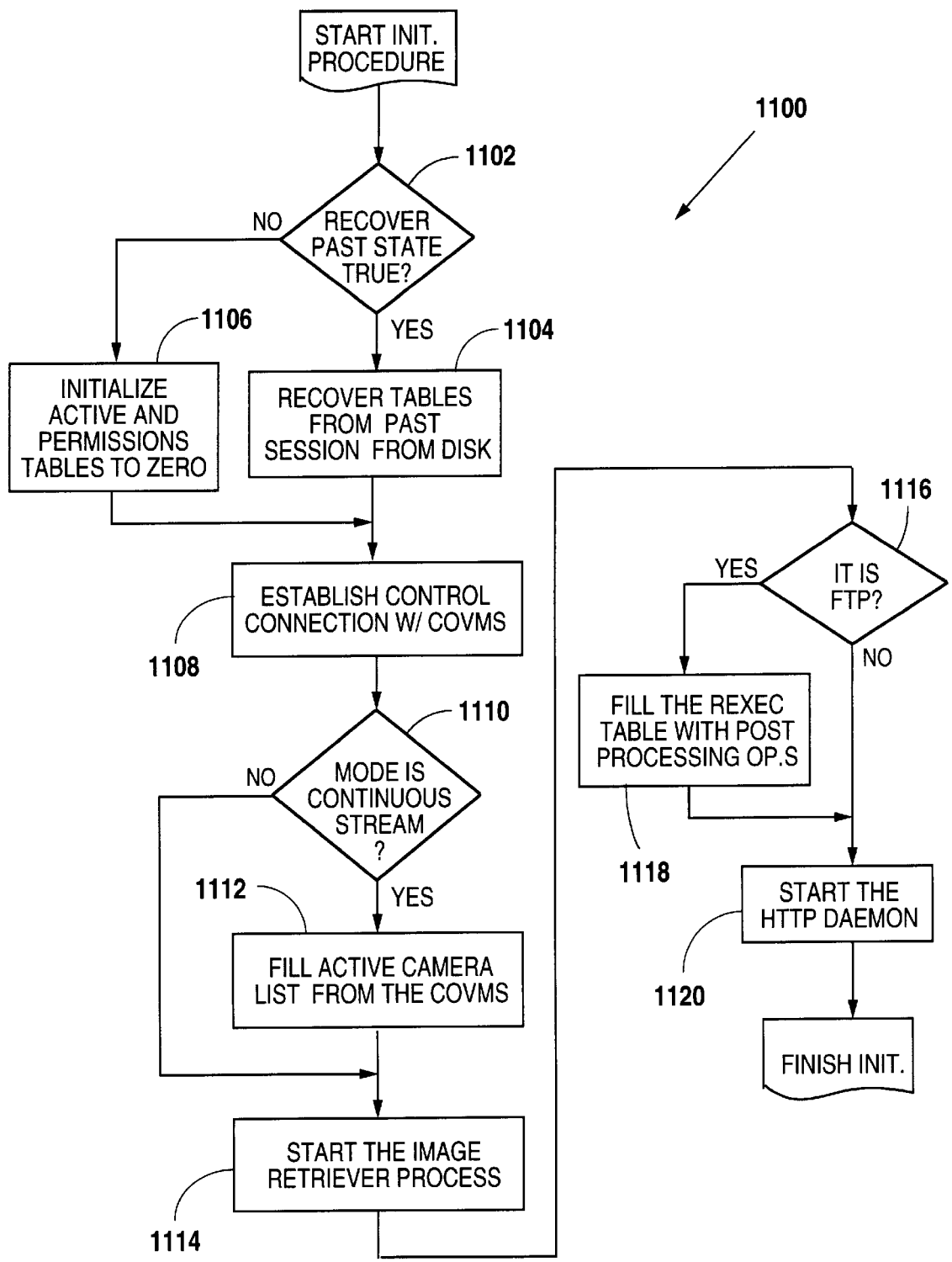
FIG. 32 is a flow diagram of an initialization process of the web site of FIG. 31, according to embodiments of the invention.

Referring to FIG. 32, before the web site 1050 can provide service to customer computers 22, the web site 1050 must be started and initialized properly in a system initialization method 1100. The active monitor list 1060 is the top level process for the entire web site 1050, and carries out most of the initialization steps. The active list monitor 1060 may be started from the OS command line by a system administrator, or it may be configured to start automatically as part of the boot process on the physical machine on which it runs, or it may be started as part of a chron service. The active list monitor 1060 carries out the following steps.

In a step 1102, after starting the initialization method 1100, the active list monitor 1060 determines, depending on its initialization file setting (RecoverPastState), either to recover the state of the prior session of the web-site from disk in a step 1104 or to recreate the tables, beginning with all null entries, in a step 1106. After the step 1104 or 1106, as the case may be, a step 1108 establishes a control and command socket connection with the COVMS 16 assigned to the web site 1050. The COVMS 16 assignment is a parameter of the initialization file of the active list monitor 1060. Once the connection is established in the step 1108, the active list monitor 1060 sends the COVMS 16 an introductory message that includes, among other things, the port on which the web site 1050 listens for incoming image transfer requests.

In a step 1110, a determination is made whether the web site 1050 is configured to operate in continuous stream mode. If the web site 1050 is configured to operate in continuous stream mode, the active list monitor 1060 fills the active camera table 1056 from the Active Camera Element Table of the COVMS 16. If the web site 1050 is, instead, configured to operate in demand-only mode, the active camera table 1056 is left blank. In either event, a step 1114 follows in which the image retriever process is begun. The step 1114 initializes the web site 1050 in preparation to receive images. In a step 1116, a determination is made whether an FTP server is being used for the image retriever process. If so, the active list monitor 1060 in a step 1118 creates a REXEC table to instruct the FTP server which post-processing operations must occur for each received image, such as file format spawning. If the mode of the web site 1050 is demand-only, the active list monitor 1060 periodically updates the REXEC table to reflect changes in number of composition of images flowing to the web site 1050. In a step 1120 following the step 1118 or the step 1116 if an FTP server is not being used, a step 1120 starts an HTTP server to accept incoming HTTP requests from client browsers of the computers 22.

At this point, the system 10 is ready to begin accepting client computer 22 requests. The flow of image data to the web site 1050 is initiated by the first client computer 22 to login if the mode is demand-only. Image flow then proceeds according to demand from the user computers 22 If the mode is continuous stream, the COVMS 16 begins sending images as soon as the file receiver process is running.

Web Site Operation from the Client Perspective

Client Account Registration

A first interaction by the customer computer 22 with the web site 1050 is to view images from the basic free service, which provides access to some number of public camera element 12 sites. Customer computers 22 which then want to register for one of the service offerings may do so either through the web site 1050 or by calling in to a provided telephone number to have a sysop set up an account.

Web Site Registration

In the case of registration through the web site 1050, a client computer 22 registration request causes the HTTP server 18 to invoke a registration script that creates a user record for the client computer 22 in the user database 1054.

Once the record is completed, the client computer 22 can login to the service at will.

Telephone Registration

In the case of computer 22 registration by telephone, the client with the computer 22 calls the provided telephone number to setup an account over the phone. A sysop uses an administrative tool to create the user record in the user database 1054. Once the record is completed, the client computer 22 may login to the service at will.

Client Login

Once a client computer 22 is registered for a service offering, the computer 22 may login to the system 10 using the login page for that particular service to which the computer 22 is subscribed. The client computer 22 logs in using a username and password that was assigned during the registration process. Client computers 22 for any services for which a greater degree of security is required can also be required to use Smartcards or other authentication tokens to augment the login process.

The login request by the client computer 22 causes the HTTP server 18 to invoke the login script for the subscribed for service. The login script performs the following steps:

1) Authenticates the user computer 22 insuring the supplied username and password match. Additional steps such as Smartcard authentication, digital signature recognition, DES type authentication may also occur here as part of the user computer 22 authentication process.

2) If the user computer 22 is successfully authenticated, the login script transfers the users ID record from the user database 1054 to the active user table 1058.

3) The script then observes the permissions level of the client computer 22 in the ID record and updates the permissions table 1061. It finds the permissions level in the table 1061 and increments the count value for that permissions level. If the value was incremented from zero to one, it sends a message to the active list monitor 1060 requesting that all camera elements 12 associated with that permissions level be brought on-line.

4) The login script then retrieves information about the chosen display interface from the ID record for the client computer 22. It invokes the display script responsible for generating the chosen interface and passes to it the display parameters for the computer 22.

5) The login script then terminates and the display script generates the returned HTML page to the client computer 22, implementing the preferred presentation interface for the client computer 22.

Client Image Request

After a client computer 22 logs into the system 10, the computer 22 may request one or more images from the system 10, depending on the service type and choices for the particular computer 22. When the client computer 22 makes a request for an image, the following steps proceed in satisfying that request.

1) As a result of the request, the HTTP server 18 invokes the corresponding image retrieval script to satisfy the request.

2) The image retrieval script first checks to see that the client computer 22 has a record in the active user table 1058. If there is no record for the user computer 22 in the table 1058, a message is returned to the client computer 22 that it must first login to the system 10 before requesting images.

3) If the record is located in the active user table 1058, the script finds the requested camera element 12 code in the active camera table 1056 and reads the record. The record tells the script where to find the image data and provides other parameters necessary for display.

4) If the client computer 22 has a static image service, as indicated by its ID record, the image retrieval script then generates the returned ITFML page including the image and other information associated with it as determined by the active camera table 1056.

5) If the client computer 22 is a subscriber to a push or stream type display mechanism, the image retrieval process returns an HTML page with all information associated with the page, but with a hole in the page. A separate push or streaming type script is then launched that fills the hole with image data according to its type.

Client Navigation

Each HTML page presented to the client computer 22 has navigation options associated with it. These options, when requested, cause the HTTP server 18 to invoke other display scripts to provide the client computer 22 with the next HTML page in the path. Menu options take client computers 22 to different menus of camera element 12 sites and other information. Search options can invoke service scripts to generate other dynamically generated menus of images or other navigation options. Finally, each HTML page presented after login has a logout option.

Client Logout

There are two ways that client computers 22 can be logged out of the system 10 either explicitly or implicitly. After the client computer 22 logs in, there is a logout option on each HTML page presented to the computer 22. The client computer 22 may explicitly logout of the system by selecting this option in which case the following steps occur:

1) The HTTP server 18 invokes the logout script.

2) The logout script removes the user computer's 22 record from the active user table 1058.

3) The logout script decrements the permissions level count for the level that user computer 22 held.

4) If that count is reduced to zero, the logout script sends a message to the active list monitor 1060 to stop the flow of image data from the COVMS 16 to the web site 1050 for the camera elements 12 in that permissions level, and remove their respective records from the active camera table 1056. This happens if the mode is "demand only."

5) The logout script then returns to the client computer 22 the system home page and terminates.

The client computer 22 may alternatively implicitly logout of the system 10 by not making any requests of the system 10 for a certain period of time. In this case implicit logout is performed by the active list monitor 1060, as follows:

1) The active list monitor 1060 periodically examines the user database 1054 examining the time of the last transaction.

2) If the time since the last transaction exceeds a certain threshold value (client_timeto_live), the active list monitor 1060 process logs the user computer 22 out of the system 10.

3) In this case, the active list monitor 1060 then performs steps 2 through 4 (listed above) of the explicit case.

4) The final step of the logout procedure is not performed with the implicit logouts because it is assumed that the user computer 22 left the system 10 by transitioning to another web page that is not part of the system 10.

Web Site Operating Modes

There are two modes in which the web site 1050 may operate: demand-only mode and continuous stream mode. These modes differ in the manner in which image data is delivered to the web site 1050.

Demand-Only Mode

In demand-only mode, the flow of image data to the web site 1050 is controlled by the number and composition of the set of logged in client computers 22. Basically, only those camera elements 12 for which the current set of logged in client computers 22 have access rights have their image data downloaded to the web site 1050 from the COVMS 16. The contents of the active camera table 1056 is controlled by the client computers 22 which are then logged into the web site 1050. This mode of operation conserves bandwidth between the web site 1050 and the COVMS 16, but limits archive capabilities at the web site 1050.

Continuous Stream Mode

In continuous stream mode, the flow of image data to the web site 1050 is controlled by the COVMS 16. The active camera table 1056 is basically a duplicate of the Active Camera Element Table of the COVMS 16, and the COVMS 16 dictates the content of the active camera table 1056 at the web site 1050. The relation is such that any camera element 12 that is registered with the COVMS 16 as active and connected has its image data downloaded to the web site 1050. This mode is bandwidth intensive but enables greater local archiving capabilities.

Permissions Groups

The system 10 implements security and camera element 12 access control by assigning each installed camera element 12 to one or more permissions group. Each registered user computer 22 of the system 10 is assigned a permissions level which determines which camera elements 12 that computer 22 may access. The permissions groups share a hierarchical relation to each other, such that their associated codes define the set of available permissions levels to which user computers 22 may be subscribed.

The lowest level of the hierarchy is level A, the set of camera elements 12 to which access is provided to every computer 22. Level B defines an additional set of camera elements 12 to which access may be restricted to some general class of user computers 22. There are then five additional levels of access that can be used for distinction and segregation of user computers 22 in accessing camera elements 12.

Protection of private camera element 12 sites begins with permissions level I. All levels above I denote private installations to which access is restricted to only user computers 22 affiliated with that site. Addition levels of distinction within a private access group is accomplished by having successively higher sublevels or subgroups within the group. Above level I, a unique letter code is assigned to each private installation. Thus, user computers 22 with permission level L at any sublevel of L do not have access to any of the camera element 12 sites in group I, or any of its subgroups. Permission level access is arranged hierarchically such that any particular client computer 22 has access to all camera elements 12 in the computers subscribed access group and all lower level sub-groups of that private access group, and all public subgroups below it. It is of note that when the web site 1050 operates in demand-only mode, the permissions level of the client computers 22 logged into the system 10 determines which images are actually downloaded to the server 18. If a client computer 22 logs in with a permissions level higher than the highest level currently being supported by the web site 1050, a request is sent to the active list monitor 1060 to update the active camera table 1056. The active list monitor 1060 then starts the flow of images from the COVMS 16 for all camera elements 12 in the higher permissions level groups. Thus, in demand-only mode, the permissions table 1061 determines which camera element's 12 images actually make it to the web site 1050 based on the permissions levels of all the currently logged in customer computers 22.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A remote viewing system for viewing a digital image of a remote location, comprising:
   a digital image acquisition device located at the remote location;
   a digital image transmission device located at the remote location and communicatively coupled to the digital image acquisition device, the digital image transmission device configured to transmit over a wireless cellular communication channel, the digital image transmission device converting an acquired digital image to packetized data prior to transmission;
   a digital image receiving device communicatively connected to the digital image transmission device for receiving the packetized data over the cellular communication channel and reconstructing the digital image from pluralities of the packetized data received in substantially real time; and
   a digital image server device, connected to the digital image receiving device;
   wherein the digital image is transmitted according to an OSI network-based protocol.

2. The system of claim 1, further comprising:
   a plurality of digital image acquisition devices respectively located at a plurality of remote locations; and
   a plurality of digital image transmission devices, each communicatively coupled to respective ones of the plurality of digital image acquisition devices the plurality of digital image transmission devices configured to transmit over a cellular communication channel, the plurality of digital image transmission devices converting an acquired digital image to packetized data prior to transmission;
   wherein the digital image receiving device coordinates communications among the plurality of digital image transmission devices and the digital image receiving device and the digital image server device make available for download select ones of the digital images acquired by select ones of the plurality of digital image acquisition devices.

3. A system for viewing an image of a remote location, comprising:
   a digital camera for acquiring the image as a real-time, live digital image;
   a switch;
   means for communicating the image to the switch over a wireless cellular communication channel via use of a packet-based transmission protocol; and
   a computer network including at least one customer computer, the network being communicatively connected to the switch;

wherein the switch receives the image in substantially real time and transmits the image to selective ones of the at least one customer computer;

wherein the digital image is transmitted according to an OSI network-based protocol.

4. The system of claim 3, further comprising:

at least one signal from one or more of the at least one customer computer communicated to the switch over the computer network;

wherein the at least one signal directs the switch to deliver the image to the one or more of the at least one customer computer and the switch so delivers the image.

5. The system of claim 4, wherein the image is communicated according to an OSI network-based protocol.

6. The system of claim 4, wherein the switch acquires and delivers pluralities of images according to a FIFO protocol.

7. A method for remotely viewing a digital image of a location, comprising the steps of:

acquiring a digital image of the location;

wirelessly transmitting the digital image over a cellular communication channel via the use of a packet-based transmission protocol;

receiving the digital image in substantially real time; and serving the digital image to a select computer connected to a network served;

wherein the digital image is transmitted according to an OSI network-based protocol.

8. A method of viewing an image of a remote location, comprising the steps of:

acquiring an image as a real-time, live digital image;

wirelessly communicating the digital image to the remote location over a cellular communication channel via use of a packet-based transmission protocol;

receiving the digital image in substantially real time;

processing the digital image;

signaling by at least one select network-enabled computer; and serving the digital image to a select one of the least one select network-enabled computer in response to the step of signaling;

wherein the digital image is transmitted according to an OSI network-based protocol.

* * * * *